United States Patent
Lu et al.

(10) Patent No.: US 11,212,805 B2
(45) Date of Patent: Dec. 28, 2021

(54) TERMINAL MODE OBTAINING METHOD AND APPARATUS, AND DEVICE

(71) Applicant: HUAWEI TECHNOLOGIES CO., LTD., Guangdong (CN)

(72) Inventors: Zhenwei Lu, Beijing (CN); Yi Shi, Beijing (CN); Deping Liu, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 46 days.

(21) Appl. No.: 16/662,890

(22) Filed: Oct. 24, 2019

(65) Prior Publication Data

US 2020/0059918 A1     Feb. 20, 2020

Related U.S. Application Data

(63) Continuation of application No. PCT/CN2017/096959, filed on Aug. 10, 2017.

(51) Int. Cl.
*H04W 72/04* (2009.01)
*H04W 76/27* (2018.01)
(Continued)

(52) U.S. Cl.
CPC ....... *H04W 72/048* (2013.01); *H04W 72/005* (2013.01); *H04W 72/0406* (2013.01);
(Continued)

(58) Field of Classification Search
CPC . H04W 72/048; H04W 76/27; H04W 72/005; H04W 72/0406; H04W 72/085; H04W 72/044; H04W 88/02
See application file for complete search history.

(56) References Cited

U.S. PATENT DOCUMENTS

2016/0044552 A1\* 2/2016 Heo .................. H04W 8/005
370/331
2018/0077721 A1\* 3/2018 Nory ................ H04W 72/1263
(Continued)

FOREIGN PATENT DOCUMENTS

CN    103155468 A    6/2013
CN    105246025 A    1/2016
(Continued)

OTHER PUBLICATIONS

CATT, "Discussion on resource pool sharing between mode 3 and mode 4," 3GPP TSG RAN WG1 Meeting #89, R1-1707450, Hangzhou, China, XP051272658, May 15-19, 2017, 3 pages.
(Continued)

*Primary Examiner* — Magdi Elhag
(74) *Attorney, Agent, or Firm* — Fish & Richardson P.C.

(57) ABSTRACT

This application provides a terminal mode obtaining method and apparatus, and a device. The method includes: obtaining, by a first terminal device, at least two types of terminal information comprising terminal information of terminal devices that can use a shared resource pool, where the shared resource pool is shared by the terminal devices in at least two types of terminal modes, and the terminal information includes a terminal mode and a terminal type; receiving control information sent by a second terminal device, where the control information indicates that the second terminal device sends data on a first time-frequency resource in a first time period in the shared resource pool; and determining, based on the control information and the terminal information, a terminal mode that is of the second terminal device and that exists when the second terminal device sends data on the first time-frequency resource.

16 Claims, 8 Drawing Sheets

(51) Int. Cl.
*H04W 72/00* (2009.01)
*H04W 72/08* (2009.01)
*H04W 88/02* (2009.01)

(52) U.S. Cl.
CPC ......... *H04W 72/085* (2013.01); *H04W 76/27* (2018.02); *H04W 72/044* (2013.01); *H04W 88/02* (2013.01)

(56) References Cited

U.S. PATENT DOCUMENTS

| | | | | |
|---|---|---|---|---|
| 2018/0146494 | A1* | 5/2018 | Khoryaev | H04W 76/23 |
| 2018/0352464 | A1* | 12/2018 | Zhou | H04W 72/042 |
| 2019/0254038 | A1* | 8/2019 | Zhang | H04W 72/042 |
| 2019/0313405 | A1* | 10/2019 | Li | H04W 72/0446 |
| 2020/0178043 | A1* | 6/2020 | Cavalcanti | H04W 4/08 |
| 2020/0314803 | A1* | 10/2020 | Zhang | H04W 74/006 |

FOREIGN PATENT DOCUMENTS

| | | |
|---|---|---|
| CN | 106332284 A | 1/2017 |
| EP | 2866369 A1 | 4/2015 |
| WO | 2015141975 A1 | 9/2015 |
| WO | 2016013538 A1 | 1/2016 |

OTHER PUBLICATIONS

EPO Supplementary Partial European Search Report issued in European Application No. 17921247 dated May 4, 2020, 15 pages.

Ericsson, "Radio resource pool sharing between mode 3 and mode 4 UEs," 3GPP TSG RAN WG1 Meeting #89, R1-1708942; Hangzhou, China, XP051274116, May 15-19, 2017, 4 pages.

LG Electronics, "Discussion on resource pool sharing between UEs using mode 3 and 4," 3GPP TSG RAN WG1 Meeting #89, R1-1707561; XP051272769, Hangzhou, China, May 15-19, 2017, 2 pages.

PCT International Search Report and Written Opinion issued in International Application No. PCT/CN2017/096959 dated May 4, 2018, 13 pages (with English translation).

Zte, "Considerations for shared resource pool between mode 3 and mode 4," 3GPP TSG RAN WG1 Meeting #89, R1-1707213, Hangzhou, P.R. China, May 15-19, 2017, 3 pages.

Zte et al., "Considerations for resource selection for 3GPP V2X Phase 2," 3GPP TSG RAN WG1 Meeting #88bis, R1-1704653, Spokane, Washington, USA, Apr. 3-7, 2017, 3 pages.

Office Action issued in Chinese Application No. 201780083583.0 dated Apr. 22, 2021, 8 pages.

Office Action issued in Indian Application No. 201947043335 dated Jan. 28, 2021, 9 pages.

* cited by examiner

1

TERMINAL MODE OBTAINING METHOD AND APPARATUS, AND DEVICE

CROSS-REFERENCE TO RELATED APPLICATIONS

This application is a continuation of International Application No. PCT/CN2017/096959, filed on Aug. 10, 2017, the disclosure of which is hereby incorporated by reference in its entirety.

TECHNICAL FIELD

This application relates to the communications field, and in particular, to a terminal mode obtaining method and apparatus, and a device.

BACKGROUND

Currently, terminals in the vehicle-to-everything (vehicle to X, V2X for short) field may include a vehicle, an in-vehicle device, a handheld device, and the like (which are collectively referred to as terminal devices below).

In a process in which a terminal device performs communication, data transmitted between terminal devices does not need to be forwarded by a base station. Before the terminal device performs communication, the base station allocates a resource pool to the terminal device, or a resource pool is preconfigured for the terminal device, so that the terminal device can use a resource in the resource pool in a communication process. Currently, the terminal device has two modes: a mode 3 and a mode 4. When the terminal device is in the mode 3, the resource used by the terminal device in the communication process is selected by the base station from the resource pool for the terminal device. When the terminal device is in the mode 4, the resource used by the terminal device in the communication process is selected by the terminal device from the resource pool.

However, when a terminal device in the mode 3 and a terminal device in the mode 4 share a same resource pool, because a terminal mode of a terminal using a time-frequency resource cannot be obtained, relatively large interference exists when the terminal device in the mode 3 and the terminal device in the mode 4 share the same resource pool.

SUMMARY

This application provides a terminal mode obtaining method and apparatus, and a device, to obtain a terminal mode that is of a terminal device and that exists when the terminal device sends data on a time-frequency resource.

According to a first aspect, this application provides a terminal mode obtaining method, where the method is performed by a first terminal device, the first terminal device may use a shared resource pool, and the shared resource pool is shared by terminal devices in at least two terminal modes. The first terminal device may obtain at least two types of terminal information of terminal devices that can use the shared resource pool, where the terminal information includes a terminal mode and a terminal type. After the first terminal device receives control information sent by a second terminal device, the first terminal device may determine, based on the control information and the terminal information, a terminal mode that is of the second terminal device and that exists when the second terminal device sends data on a first time-frequency resource. The control information is used to indicate that the second terminal device sends data on the first time-frequency resource in a first time period in the shared resource pool.

In this application, when the shared resource pool is configured, the at least two types of terminal information of the terminal devices that can use the shared resource pool are configured. When the second terminal device needs to send data on the first time-frequency resource in the shared resource pool, the second terminal device sends the control information. Correspondingly, after receiving the control information sent by the second terminal device, the first terminal device may determine, based on the at least two types of terminal information and the control information, the terminal mode that is of the second terminal device and that exists when the second terminal device sends data on the first time-frequency resource.

Optionally, a first terminal type is an R.14 terminal type, a second terminal type is an R.15 terminal type, a first terminal mode is a mode 3, and a second terminal mode is a mode 4.

Optionally, when a terminal type of the second terminal device is the second terminal type, the control information includes the terminal mode or the terminal type of the second terminal device.

Optionally, the terminal information is broadcast by a base station, or is sent by a base station by using radio resource control RRC dedicated signaling; or the terminal information is preconfigured in the first terminal device.

Optionally, the first terminal device may use at least the following two feasible implementations:

One feasible implementation is as follows:

If the control information includes a terminal mode, the first terminal device determines the terminal mode included in the control information as the terminal mode that is of the second terminal device and that exists when the second terminal device sends data on the first time-frequency resource; or if the control information does not include a terminal mode, the first terminal device determines first terminal information from the at least two types of terminal information, and determines a terminal mode included in the first terminal information as the terminal mode that is of the second terminal device and that exists when the second terminal device sends data on the first time-frequency resource, where a terminal type in the first terminal information is the first terminal type.

This feasible implementation is applicable to all application scenarios. For example, when the at least two types of terminal information include R.14mode3 and R.15mode4, or R.14mode4 and R.15mode3, or R.14mode3, R.15mode3, and R.15mode4, or R.14mode4, R.15mode3, and R.15mode4, the first terminal device may determine, in the foregoing feasible implementation, the terminal mode that is of the second terminal device and that exists when the second terminal device sends data on the first time-frequency resource.

The other feasible implementation is as follows:

If the control information includes a terminal type, the first terminal device determines second terminal information from the at least two types of terminal information based on the fact that the control information includes a terminal type, and determines a terminal mode included in the second terminal information as the terminal mode that is of the second terminal device and that exists when the second terminal device sends data on the first time-frequency resource, where a terminal type in the second terminal information is the second terminal type; or if the control information does not include a terminal type, the first terminal device determines first terminal information from the at least two types of terminal information, and determines a terminal type included in the first terminal information as the terminal type that is of the second terminal device and that exists when the second terminal device sends data on the first time-frequency resource, where the terminal type in the first terminal information is the first terminal type.

This feasible implementation is applicable to some application scenarios, that is, in the at least two types of terminal information, terminal modes in every two types of terminal information are different, and terminal types in every two types of terminal information are different. Correspondingly, there are two types of terminal information. For example, the two types of terminal information include R.14mode3 and R.15mode4, or the at least two types of terminal information include R.14mode4 and R.15mode3.

On the basis of any one of the foregoing methods, when a terminal type of the first terminal device is the second terminal type, a terminal mode of the first terminal device is the second terminal mode (device information of the first terminal device is R.15mode4), and there is at least one first time-frequency resource, correspondingly, after determining a terminal mode that is of at least one second terminal device and that exists when the at least one second terminal device sends data on the at least one first time-frequency resource, the first terminal device may further select a candidate time-frequency resource from a time-frequency resource in a second time period. To be specific, the first terminal device determines the candidate time-frequency resource from the time-frequency resource in the second time period in the shared resource pool based on signal strength corresponding to the at least one first time-frequency resource and the terminal mode that is of the second terminal device and that exists when the second terminal device sends data on the at least one first time-frequency resource.

Optionally, the first terminal device may determine the candidate time-frequency resource from the time-frequency resource in the second time period in at least the following two feasible implementations:

In one feasible implementation, the first terminal device determines a second time-frequency resource and a third time-frequency resource from the at least one first time-frequency resource based on the terminal mode that is of the second terminal device and that exists when the second terminal device sends data on the at least one first time-frequency resource, where a terminal mode of a terminal device that sends data on the second time-frequency resource is the first terminal mode, and a terminal mode of a terminal device that sends data on the third time-frequency resource is the second terminal mode. The first terminal device determines the candidate time-frequency resource from the time-frequency resource in the second time period based on a time-domain time interval corresponding to the second time-frequency resource, a time-domain time interval corresponding to the third time-frequency resource, and signal strength corresponding to the third time-frequency resource.

Optionally, the first terminal device determines a fifth time-frequency resource from the time-frequency resource in the second time period based on the time-domain time interval corresponding to the second time-frequency resource, where a terminal mode corresponding to the fifth time-frequency resource is the same as the terminal mode of the terminal device that sends data on the second time-frequency resource. The first terminal device determines a sixth time-frequency resource from the time-frequency resource in the second time period based on the time-domain time interval corresponding to the third time-frequency resource, where a terminal mode corresponding to the sixth time-frequency resource is the same as the terminal mode of the terminal device that sends data on the third time-frequency resource, and signal strength corresponding to the sixth time-frequency resource is the same as the signal strength corresponding to the third time-frequency resource. The first terminal device determines the candidate time-frequency resource from the time-frequency resource in the second time period based on the fifth time-frequency resource and the signal strength corresponding to the sixth time-frequency resource.

Optionally, the first terminal device determines, as a primary candidate time-frequency resource, a time-frequency resource other than the fifth time-frequency resource in the time-frequency resource in the second time period. The first terminal device determines the candidate time-frequency resource from the primary candidate time-frequency resource based on the signal strength corresponding to the sixth time-frequency resource.

In this feasible implementation, the fifth time-frequency resource determined by the first terminal device may be used by a terminal device in the first terminal mode in future. Because the terminal device in the first terminal mode has a relatively strict interference requirement on another terminal device during data receiving/sending, the first terminal device excludes the fifth time-frequency resource from the candidate time-frequency resource, to ensure that the first terminal device definitely does not send data on the fifth time-frequency resource, thereby preventing the first terminal device from interfering with the terminal device that is in the first terminal mode and that may send data on the fifth time-frequency resource. Further, the determined sixth time-frequency resource may be used by a terminal device in the second terminal mode in future. When the signal strength that is corresponding to the sixth time-frequency resource and is estimated by the first terminal device is greater than a preset threshold, it indicates that power of the terminal device that sends data on the sixth time-frequency resource in future is excessively large, or a distance between the first terminal device and the terminal device that sends data on the sixth time-frequency resource in future is excessively short. Therefore, the first terminal device excludes, from the candidate time-frequency resource, a time-frequency resource that is corresponding to signal strength greater than the preset threshold and that is in the sixth time-frequency resource, to avoid mutual interference between the first terminal device and the terminal device that sends data on the sixth time-frequency resource corresponding to the signal strength greater than the preset threshold. It can be learned from the foregoing description that, the first terminal device may accurately select the candidate time-frequency resource from the time-frequency resource in the second time period by estimating a terminal mode corresponding to the time-frequency resource in the second time period.

The other feasible implementation is as follows:

The first terminal device determines, based on a time-domain time interval corresponding to the at least one first time-frequency resource and the terminal mode that is of the second terminal device and that exists when the second terminal device sends data on the at least one first time-frequency resource, a terminal mode corresponding to at least one fourth time-frequency resource in the time-frequency resource in the second time period. The first terminal device determines, based on the signal strength corresponding to the at least one first time-frequency resource and the time-domain time interval corresponding to the at least one first time-frequency resource, signal strength corresponding to the at least one fourth time-frequency resource. The first terminal device determines the candidate time-frequency resource from the time-frequency resource in the second time period based on the terminal mode corresponding to the at least one fourth time-frequency resource and the signal strength corresponding to the at least one fourth time-frequency resource.

Optionally, the first terminal device determines a fifth time-frequency resource and a sixth time-frequency resource from the at least one fourth time-frequency resource based on the terminal mode corresponding to the at least one fourth time-frequency resource, where a terminal mode corresponding to the fifth time-frequency resource is the first terminal mode, and a terminal mode corresponding to the sixth time-frequency resource is the second terminal mode. The first terminal device determines the candidate time-frequency resource from the time-frequency resource in the second time period based on signal strength corresponding to the fifth time-frequency resource, a first threshold corresponding to the first terminal mode, signal strength corresponding to the sixth time-frequency resource, and a second threshold corresponding to the second terminal mode.

In this feasible implementation, the first terminal device first determines the at least one fourth time-frequency resource from the time-frequency resource in the second time period, and obtains a terminal mode and signal strength that are corresponding to each fourth time-frequency resource. Different terminal modes are corresponding to different thresholds. The first terminal device determines the fifth time-frequency resource and the sixth time-frequency resource from the at least one fourth time-frequency resource based on the terminal mode corresponding to the fourth time-frequency resource, and determines the candidate time-frequency resource from the time-frequency resource in the second time period based on the signal strength corresponding to the fifth time-frequency resource, the first threshold corresponding to the first terminal mode, the signal strength corresponding to the sixth time-frequency resource, and the second threshold corresponding to the second terminal mode. Because an interference requirement of a terminal device in the first terminal mode on another terminal device is different from an interference requirement of a terminal device in the second terminal mode on another terminal device, the candidate time-frequency resource can be accurately selected from the time-frequency resource in the second time period by using the foregoing method.

On the basis of any one of the foregoing methods, when a terminal type of the first terminal device is the second terminal type, a terminal mode of the first terminal device is the first terminal mode (device information of the first terminal device is R.15mode3), and there is at least one first time-frequency resource, correspondingly, after determining a terminal mode that is of at least one second terminal device and that exists when the at least one second terminal device sends data on the at least one first time-frequency resource, the first terminal device may further perform the following operations.

The first terminal device determines a sixth time domain resource from a time-frequency resource in a second time period in the shared resource pool based on a time-domain time interval corresponding to the at least one first time-frequency resource and the terminal mode that is of the second terminal device and that exists when the second terminal device sends data on the at least one first time-frequency resource, where a terminal mode corresponding to the sixth time domain resource is the second terminal mode. The first terminal device obtains attribute information of the sixth time-frequency resource, and sends the attribute information of the sixth time-frequency resource to the base station, where the attribute information includes at least a location of the sixth time-frequency resource in the shared resource pool, or the attribute information includes at least a location of the sixth time-frequency resource in the shared resource pool and signal strength corresponding to the sixth time-frequency resource.

In the foregoing process, after the base station receives the attribute information of the sixth time-frequency resource, when the base station allocates a time-frequency resource to a terminal device from the second time-frequency resource, the base station first excludes the sixth time-frequency resource from the candidate time-frequency resource, and then allocates a time-frequency resource to the terminal device from the candidate time-frequency resource. In this way, a terminal device in the second terminal mode can be prevented from interfering with a terminal device in the first terminal mode.

According to a second aspect, this application provides a terminal mode obtaining method, where the method includes: determining, by a second terminal device, control information, where the control information includes a terminal mode or a terminal type of the second terminal device, and the terminal type of the second terminal device is a second terminal type; and sending, by the second terminal device, the control information to a first terminal device.

In the foregoing process, after the second terminal device sends the control information to the first terminal device, the first terminal device can determine, based on the control information and at least two types of terminal information, a terminal mode that is of the second terminal device and that exists when the second terminal device sends data on a first time-frequency resource.

According to a third aspect, this application provides a terminal mode obtaining method, where the method includes: determining, by a base station, at least two types of terminal information corresponding to a shared resource pool, where the shared resource pool is shared by terminal devices in at least two types of terminal modes, the at least two types of terminal information are terminal information of terminal devices that can use the shared resource pool, and the terminal information includes a terminal mode and a terminal type; and sending, by the base station, the at least two types of terminal information to a first terminal device.

In the foregoing process, after the base station sends the at least two types of terminal information to the first terminal device, the first terminal device can determine, based on the at least two types of terminal information and control information, a terminal mode that is of a second terminal device and that exists when the second terminal device sends data on a first time-frequency resource.

Optionally, the base station may further receive attribute information that is of a sixth time-frequency resource and that is sent by the first terminal device, where the attribute information includes at least a location of the sixth time-frequency resource in the shared resource pool, or the attribute information includes at least a location of the sixth time-frequency resource in the shared resource pool and signal strength corresponding to the sixth time-frequency resource. The base station determines a candidate time-frequency resource based on the attribute information of the sixth time-frequency resource.

Optionally, when the attribute information includes the location of the sixth time-frequency resource in the shared resource pool, the base station may determine, as the candidate time-frequency resource, a time-frequency resource other than the sixth time-frequency resource in the shared resource pool based on the location of the sixth time-frequency resource in the shared resource pool.

Optionally, when the attribute information includes the location of the sixth time-frequency resource in the shared resource pool and the signal strength corresponding to the sixth time-frequency resource, the base station may determine, as the candidate time-frequency resource based on the location of the sixth time-frequency resource in the shared resource pool and the signal strength corresponding to the sixth time-frequency resource, a time-frequency resource other than a sixth time-frequency resource that is corresponding to signal strength greater than a preset threshold and that is in the shared resource pool.

In the foregoing process, the base station may determine a time-frequency resource for a terminal device more accurately, to reduce interference between terminal devices.

According to a fourth aspect, this application provides a terminal mode obtaining apparatus, applied to a first terminal device, where the apparatus includes an obtaining module, a receiving module, and a first determining module, where the obtaining module is configured to obtain at least two types of terminal information, where the at least two types of terminal information are terminal information of terminal devices that can use a shared resource pool, the shared resource pool is shared by terminal devices in at least two types of terminal modes, and the terminal information includes a terminal mode and a terminal type;

the receiving module is configured to receive control information sent by a second terminal device, where the control information is used to indicate that the second terminal device sends data on a first time-frequency resource in a first time period in the shared resource pool; and the first determining module is configured to determine, based on the control information and the terminal information, a terminal mode that is of the second terminal device and that exists when the second terminal device sends data on the first time-frequency resource.

In a possible implementation, when a terminal type of the second terminal device is a second terminal type, the control information includes the terminal mode or the terminal type of the second terminal device.

In another possible implementation, the terminal information is broadcast by a base station, or is sent by a base station by using radio resource control RRC dedicated signaling; or the terminal information is preconfigured in the first terminal device.

In another possible implementation, the first determining module is specifically configured to:

if the control information includes a terminal mode, determine the terminal mode included in the control information as the terminal mode of the second terminal device; or if the control information does not include the terminal mode, determine first terminal information from the at least two types of terminal information, and determine a terminal mode included in the first terminal information as the terminal mode of the second terminal device, where a terminal type in the first terminal information is a first terminal type.

In another possible implementation, in the at least two types of terminal information, terminal modes in every two types of terminal information are different, and terminal types in every two types of terminal information are different, and the first determining module is specifically configured to:

if the control information includes a terminal type, determine second terminal information from the at least two types of terminal information based on the fact that the control information includes a terminal type, and determine a terminal mode included in the second terminal information as the terminal mode of the second terminal device, where a terminal type in the second terminal information is the second terminal type; or if the control information does not include the terminal type, determine first terminal information from the at least two types of terminal information, and determine a terminal type included in the first terminal information as the terminal type of the second terminal device, where the terminal type in the first terminal information is a first terminal type.

In another possible implementation, when a terminal type of the first terminal device is the second terminal type, a terminal mode of the first terminal device is a second terminal mode, and there is at least one first time-frequency resource, the apparatus further includes a second determining module, where the second determining module is specifically configured to determine a candidate time-frequency resource from a time-frequency resource in a second time period in the shared resource pool based on signal strength corresponding to the at least one first time-frequency resource and a terminal mode that is of the second terminal device and that exists when the second terminal device sends data on the at least one first time-frequency resource.

In another possible implementation, the second determining module is specifically configured to:

determine a second time-frequency resource and a third time-frequency resource from the at least one first time-frequency resource based on the terminal mode that is of the second terminal device and that exists when the second terminal device sends data on the at least one first time-frequency resource, where a terminal mode of a terminal device that sends data on the second time-frequency resource is a first terminal mode, and a terminal mode of a terminal device that sends data on the third time-frequency resource is the second terminal mode; and determine the candidate time-frequency resource from the time-frequency resource in the second time period based on a time-domain time interval corresponding to the second time-frequency resource, a time-domain time interval corresponding to the third time-frequency resource, and signal strength corresponding to the third time-frequency resource.

In another possible implementation, the second determining module is specifically configured to:

determine a fifth time-frequency resource from the time-frequency resource in the second time period based on the time-domain time interval corresponding to the second time-frequency resource, where a terminal mode corresponding to the fifth time-frequency resource is the same as the terminal mode of the terminal device that sends data on the second time-frequency resource;

determine a sixth time-frequency resource from the time-frequency resource in the second time period based on the time-domain time interval corresponding to the third time-frequency resource, where a terminal mode corresponding to the sixth time-frequency resource is the same as the terminal mode of the terminal device that sends data on the third time-frequency resource, and signal strength corresponding to the sixth time-frequency resource is the same as the signal strength corresponding to the third time-frequency resource; and determine the candidate time-frequency resource from the time-frequency resource in the second time period based on the fifth time-frequency resource and the signal strength corresponding to the sixth time-frequency resource.

In another possible implementation, the second determining module is specifically configured to:

determine, as a primary candidate time-frequency resource, a time-frequency resource other than the fifth time-frequency resource in the time-frequency resource in the second time period; and determine the candidate time-frequency resource from the primary candidate time-frequency resource based on the signal strength corresponding to the sixth time-frequency resource.

In another possible implementation, the second determining module is specifically configured to:

determine, based on a time-domain time interval corresponding to the at least one first time-frequency resource and the terminal mode that is of the second terminal device and that exists when the second terminal device sends data on the at least one first time-frequency resource, a terminal mode corresponding to at least one fourth time-frequency resource in the time-frequency resource in the second time period;

determine, based on the signal strength corresponding to the at least one first time-frequency resource and the time-domain time interval corresponding to the at least one first time-frequency resource, signal strength corresponding to the at least one fourth time-frequency resource; and determine the candidate time-frequency resource from the time-frequency resource in the second time period based on the terminal mode corresponding to the at least one fourth time-frequency resource and the signal strength corresponding to the at least one fourth time-frequency resource.

In another possible implementation, the second determining module is specifically configured to:

determine a fifth time-frequency resource and a sixth time-frequency resource from the at least one fourth time-frequency resource based on the terminal mode corresponding to the at least one fourth time-frequency resource, where a terminal mode corresponding to the fifth time-frequency resource is a first terminal mode, and a terminal mode corresponding to the sixth time-frequency resource is the second terminal mode; and determine the candidate time-frequency resource from the time-frequency resource in the second time period based on signal strength corresponding to the fifth time-frequency resource, a first threshold corresponding to the first terminal mode, signal strength corresponding to the sixth time-frequency resource, and a second threshold corresponding to the second terminal mode.

In another possible implementation, when a terminal type of the first terminal device is the second terminal type, a terminal mode of the first terminal device is a first terminal mode, and there is at least one first time-frequency resource, the apparatus further includes a sending module, where the second determining module is further configured to determine a sixth time domain resource from a time-frequency resource in a second time period in the shared resource pool based on a time-domain time interval corresponding to the at least one first time-frequency resource and a terminal mode that is of the second terminal device and that exists when the second terminal device sends data on the at least one first time-frequency resource, where a terminal mode corresponding to the sixth time domain resource is a second terminal mode; and the sending module is configured to: obtain attribute information of the sixth time-frequency resource, and send the attribute information of the sixth time-frequency resource to the base station, where the attribute information includes at least a location of the sixth time-frequency resource in the shared resource pool, or the attribute information includes at least a location of the sixth time-frequency resource in the shared resource pool and signal strength corresponding to the sixth time-frequency resource.

In another possible implementation, the first terminal type is an R.14 terminal type, and the second terminal type is an R.15 terminal type.

The first terminal mode is a mode 3, and the second terminal mode is a mode 4.

According to a fifth aspect, this application provides a terminal mode obtaining apparatus, including a determining module and a sending module, where the determining module is configured to determine control information, where the control information includes a terminal mode or a terminal type of the second terminal device, and the terminal type of the second terminal device is a second terminal type; and the sending module is configured to send the control information to a first terminal device.

According to a sixth aspect, this application provides a terminal mode obtaining apparatus, including a first determining module and a sending module, where the first determining module is configured to determine at least two types of terminal information corresponding to a shared resource pool, where the shared resource pool is shared by terminal devices in at least two types of terminal modes, the at least two types of terminal information are terminal information of terminal devices that can use the shared resource pool, and the terminal information includes a terminal mode and a terminal type; and the sending module is configured to send the at least two types of terminal information to a first terminal device.

In a possible implementation, the apparatus further includes a receiving module and a second determining module, where the receiving module is configured to receive attribute information that is of a sixth time-frequency resource and that is sent by the first terminal device, where the attribute information includes at least a location of the sixth time-frequency resource in the shared resource pool, or the attribute information includes at least a location of the sixth time-frequency resource in the shared resource pool and signal strength corresponding to the sixth time-frequency resource; and the second determining module is configured to determine a candidate time-frequency resource based on the attribute information of the sixth time-frequency resource.

According to a seventh aspect, this application provides a terminal device, including a processor, a memory, and a communications bus, where the communications bus is configured to implement connections between components, the memory is configured to store a program instruction, and the processor is configured to: read the program instruction in the memory, and perform, based on the program instruction in the memory, the method according to the first aspect.

According to an eighth aspect, this application provides a terminal device, including a processor, a memory, and a communications bus, where the communications bus is configured to implement connections between components, the memory is configured to store a program instruction, and the processor is configured to: read the program instruction in the memory, and perform, based on the program instruction in the memory, the method according to the second aspect.

According to a ninth aspect, this application provides a base station, including a processor, a memory, and a communications bus, where the communications bus is configured to implement connections between components, the memory is configured to store a program instruction, and the processor is configured to: read the program instruction in the memory, and perform, based on the program instruction in the memory, the method according to the third aspect.

According to a tenth aspect, this application provides a computer readable storage medium. The computer readable storage medium stores a computer executable instruction. When at least one processor of a storage device executes the computer executable instruction, the storage device performs the data read method provided in the foregoing possible designs.

According to an eleventh aspect, this application provides a computer program product. The computer program product includes a computer executable instruction. The computer executable instruction is stored in a computer readable storage medium. At least one processor of a storage device may read the computer executable instruction from the computer readable storage medium. The at least one processor executes the computer executable instruction, so that the storage device performs the data read method provided in the possible designs in the foregoing method embodiments.

According to a twelfth aspect, this application provides a chip system. The chip system includes a processor, configured to support a terminal device in implementing a function in the foregoing aspects, for example, processing information in the foregoing method. In a possible design, the chip system further includes a memory, where the memory is configured to store a program instruction and data that are necessary for a data sending device. The chip system may include a chip, or may include a chip and another discrete device.

According to the terminal mode obtaining method and apparatus, and the device that are provided in this application, when the shared resource pool is configured, the at least two types of terminal information of the terminal devices that can use the shared resource pool are configured. When the second terminal device needs to send data on the first time-frequency resource in the shared resource pool, the second terminal device sends the control information. Correspondingly, after receiving the control information sent by the second terminal device, the first terminal device may determine, based on the at least two types of terminal information and the control information, the terminal mode that is of the second terminal device and that exists when the second terminal device sends data on the first time-frequency resource.

DESCRIPTION OF EMBODIMENTS

Figure 1:
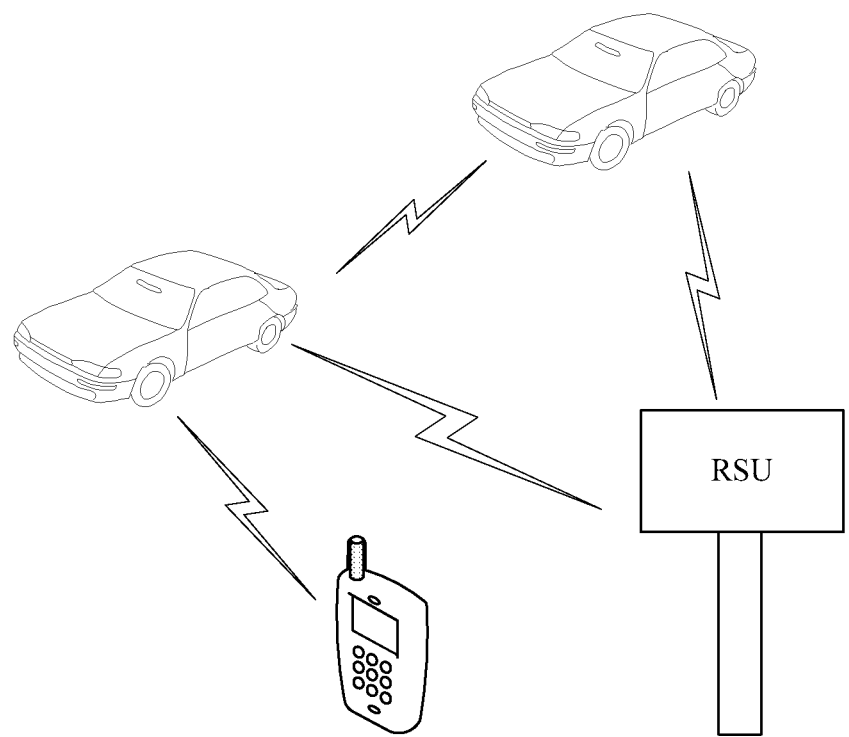
FIG. 1 is a schematic diagram of a V2X application scenario according to this application.

FIG. 1 is a schematic diagram of a V2X application scenario according to this application. Refer to FIG. 1, there are a plurality of terminal devices. For example, the terminal devices may include a vehicle, a roadside unit (Road Side Unit, RSU for short), user equipment (User Equipment, UE for short), and the like. For example, the RSU may be an electronic toll collection (Electronic Toll Collection, ETC for short) system, an electronic billboard, or the like. The vehicle may directly communicate with any other terminal device, without forwarding by a base station. Optionally, the base station may perform resource configuration, scheduling, coordination, and the like, to assist the vehicle in directly communicating with another terminal device.

Figure 2:
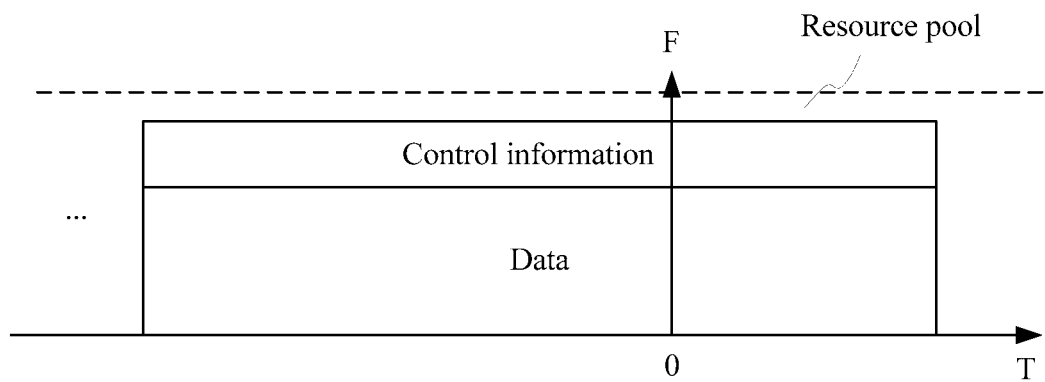
FIG. 2 is a schematic structural diagram of a resource pool according to this application.

For ease of understanding of this application, a basic communication manner of the terminal device in the V2X scenario is first described. Before the terminal device performs communication, the base station allocates a resource pool to the terminal device, or a resource pool may be preconfigured for the terminal device. The resource pool is a set of a plurality of time-frequency resources. The following describes in detail the resource pool with reference to FIG. 2. FIG. 2 is a schematic structural diagram of a resource pool according to this application. Refer to FIG. 2, the horizontal axis represents a time domain, the vertical axis represents a frequency domain, and the coordinate origin represents a current moment. Some time-frequency resources in the resource pool are used to send control information, and other time-frequency resources in the resource pool are used to send data. When sending data, the terminal device needs to send control information, and indicates, in the control information, a time-frequency resource occupied when the data is sent, so that a terminal device that receives the control information can receive the data on a corresponding time-frequency resource.

When sending either the control information or the data, the terminal device needs to use a time-frequency resource in the resource pool. Currently, the terminal device may use the resource in the resource pool in two modes: a mode 3 and a mode 4. When the terminal device uses the resource in the resource pool in the mode 3, the base station allocates a time-frequency resource to the terminal from a time-frequency resource after the current moment in the resource pool. When the terminal device uses the resource in the resource pool in the mode 4, the terminal device estimates a time-frequency resource after the current moment in the resource pool based on occupation of a time-frequency resource before the current moment in the resource pool, and selects a time-frequency resource from the time-frequency resource after the current moment.

In the prior art, a time-frequency resource used by a terminal device in the mode 3 is allocated by the base station, a time-frequency resource used by a terminal device in the mode 4 is selected by the terminal device, and an interference requirement of the terminal device in the mode 3 on another terminal device during data receiving/sending is stricter than an interference requirement of the terminal device in the mode 4 on another terminal device during data receiving/sending. Therefore, to avoid mutual interference between the terminal device in the mode 3 and the terminal device in the mode 4 during data receiving/sending, the terminal device in the mode 3 and the terminal device in the mode 4 do not share a same resource pool.

In this application, to improve resource utilization of a resource pool, the resource pool may be shared by the terminal device in the mode 3 and the terminal device in the mode 4. In addition, to avoid mutual interference between the terminal device in the mode 3 and the terminal device in the mode 4 during data receiving/sending, when the terminal device in the mode 4 selects a time-frequency resource that needs to be used or when the terminal device in the mode 3 requests the base station to allocate a time-frequency resource, the terminal device may obtain, by using the method shown in this application, a terminal mode (the mode 3 or the mode 4) of a terminal device that uses a time-frequency resource before the current moment; estimate, based on the terminal mode of the terminal device that uses the time-frequency resource before the current moment, a terminal mode of a terminal device that uses a time-frequency resource after the current moment; and selects a resource based on the estimated terminal mode. Therefore, mutual interference between the terminal device in the mode 3 and the terminal device in the mode 4 during data receiving/sending is avoided.

The following describes in detail a terminal mode obtaining method and a resource selection method by using specific embodiments. It should be noted that, the following specific embodiments may be combined with each other, and same or similar content is not repeatedly described in different embodiments.

Figure 3:
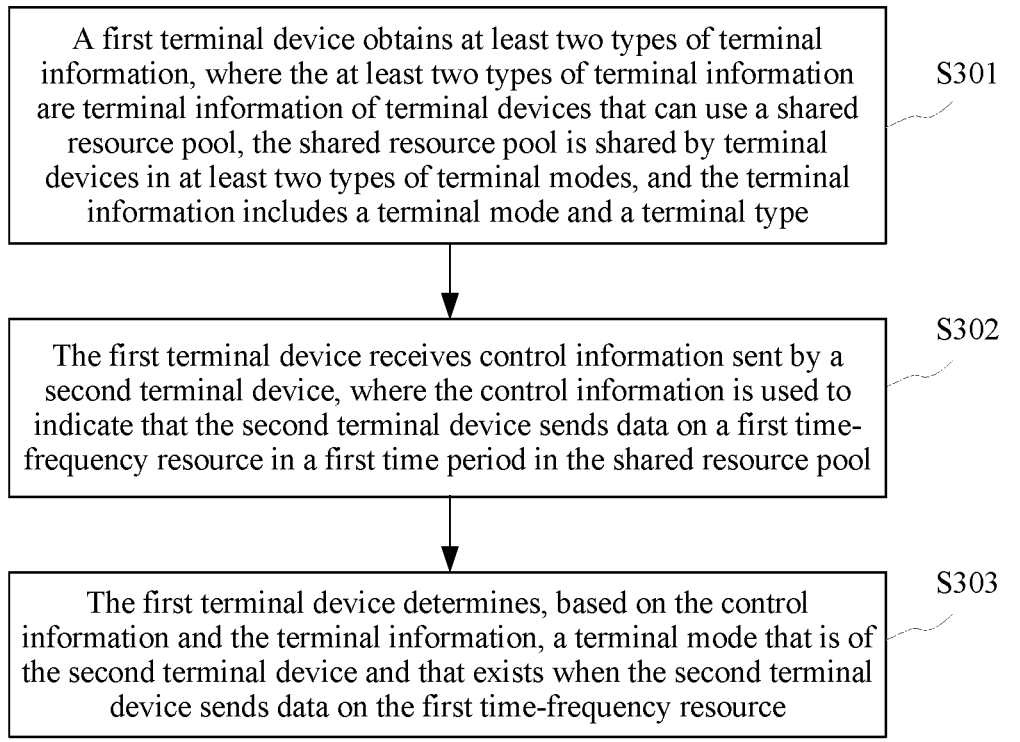
FIG. 3 is a schematic flowchart of a terminal mode obtaining method according to this application.

FIG. 3 is a schematic flowchart of a terminal mode obtaining method according to this application. Refer to FIG. 3, the method may include the following steps.

S301. A first terminal device obtains at least two types of terminal information, where the at least two types of terminal information are terminal information of terminal devices that can use a shared resource pool, the shared resource pool is shared by terminal devices in at least two types of terminal modes, and the terminal information includes a terminal mode and a terminal type.

Optionally, the first terminal device may be any device in a V2X scenario. For example, the first terminal device may be a device such as a vehicle, UE, or an RSU.

Optionally, the terminal information includes a terminal mode and a terminal type. The terminal mode may include a first terminal mode and a second terminal mode. The first terminal mode is a mode 3 (mode 3), and the second terminal mode is a mode 4 (mode 4). A terminal device may have different terminal modes. For example, a terminal mode of the terminal device may be the mode 3 at a first moment; or a terminal mode of the terminal device may be the mode 4 at a second moment. The terminal type may include a first terminal type and a second terminal type. The first terminal type is R.14 (Release.14), and the second terminal type is R.15 (Release.15). Correspondingly, there may be at least the following four types of terminal information: R.14mode3, R.14mode4, R.15mode3, and R.15mode4.

Optionally, for a shared resource pool, terminal information of terminal devices that can use the shared resource pool is preconfigured. Optionally, the at least two types of terminal information of the terminal devices that can use the shared resource pool may be broadcast by a base station or sent by a base station by using radio resource control RRC dedicated signaling, or may be preconfigured in the first terminal device.

Optionally, a part of terminal information of the terminal devices that can use the shared resource pool may be specified in a protocol, and another part of terminal information may be provided by the base station or preconfigured. Correspondingly, the first terminal device may obtain the part of terminal information from the protocol, and obtain the another part of terminal information by using the base station or through pre-configuration.

For example, if the protocol may specify that the terminal information that can use the shared resource pool includes R.15mode3 and R.15mode4, and the terminal information that is broadcast by the base station and that can use the shared resource pool includes R.14mode4, the first terminal device may determine that the terminal information of the terminal devices that can use the shared resource pool includes R.15mode3, R.15mode4, and R.14mode4.

The shared resource pool may be shared by terminal devices in at least two terminal modes, and the terminal mode includes the mode 3 and the mode 4. Therefore, the shared resource pool may be shared by a terminal device in the mode 3 and a terminal device in the mode 4. It should be noted that, the terminal information of the terminal devices that can use the shared resource pool cannot include both R.14mode3 and R.14mode4.

Optionally, the at least two types of terminal information of the terminal devices that can use the shared resource pool may include at least the following four cases:

R.14mode3 and R.15mode4;
R.14mode4 and R.15mode3;
R.14mode3, R.15mode3, and R.15mode4; and
R.14mode4, R.15mode3, and R.15mode4.

It should be noted that, the shared resource pool may also be shared by terminal devices in a same terminal mode but of different terminal types. However, when the shared resource pool is shared by terminal devices in a same terminal mode but of different terminal types, for example, when the shared resource pool is shared by a terminal device whose terminal information is R.14mode3 and a terminal device whose terminal information is R.15mode3, or when the shared resource pool is shared by a terminal device whose terminal information is R.14mode4 and a terminal device whose terminal information is R.15mode4, there is no interference caused by improper resource use. Therefore, the solutions discussed in this application do not include the case.

It should be noted that, after the first terminal device obtains the at least two types of terminal information, if the first terminal device determines that terminal modes in the at least two types of terminal information are the same, for example, the at least two types of terminal information include R.14mode3 and R.15mode3 or the at least two types of terminal information include R.14mode4 and R.15mode4, the first terminal device may perform processing in a prior-art processing manner.

S302. The first terminal device receives control information sent by a second terminal device, where the control information is used to indicate that the second terminal device sends data on a first time-frequency resource in a first time period in the shared resource pool.

Optionally, the control information may be scheduling assignment (Scheduling Assignment, SA for short) information or sidelink control information (Sidelink Control Information, SCI for short).

In the V2X scenario, when sending data, a terminal device also sends corresponding control information. The terminal device usually sends the data and the control information through broadcast. Optionally, for data in a same service, the terminal device usually sends the data and the control information periodically.

Optionally, before the second terminal device sends data, the second terminal device selects, from the shared resource pool, a time-frequency resource used to send the control information and a time-frequency resource used to send the data. There is a preset correspondence between the time-frequency resource used to send the control information and the time-frequency resource used to send the data. When sending the control information on the time-frequency resource corresponding to the control information, the second terminal device adds, into the control information, indication information indicating the time-frequency resource used when the data is sent. In this way, after receiving the control information sent by the second terminal device, another terminal device (for example, the first terminal device) can receive the data on the time-frequency resource indicated by the control information.

It should be noted that, the control information may further include other content, for example, modulation and coding scheme (Modulation and Coding Scheme, MCS for short) information, priority information, a time-domain time interval, and a quantity of transmission times. Content included in the control information is not specifically limited in this application.

Optionally, when a terminal type of the second terminal device is the second terminal type (R.15), the control information sent by the second terminal device includes a terminal mode or the terminal type (R.15) of the second terminal device.

Optionally, a flag field may be added into the control information, and content in the newly added flag field is used to indicate the terminal mode or the terminal type of the second terminal device. Optionally, the flag field may include one or more bits.

For example, when the control information includes a terminal mode, a 1-bit flag field may be added into the control information. When a value in the flag field is 0, it indicates that the terminal mode of the terminal device is the mode 3. When a value in the flag field is 1, it indicates that the terminal mode of the terminal device is the mode 4.

When the control information includes a terminal type, a 1-bit flag field may be added into the control information, and a value in the flag field may be randomly set. To be specific, provided that the control information includes the newly added flag field, it may be determined that the terminal mode of the terminal device is the second terminal type.

Optionally, when the control information includes a reserved field, some or all bits in the reserved field may be used to indicate the terminal mode or the terminal type of the second terminal device by using the reserved bit.

For example, when the control information includes a terminal mode, a 2-bit reserved field may be used. Default values of values in the reserved field are usually 0. When the 2-bit reserved field is set to 01, it indicates that the terminal mode of the terminal device is the mode 3; or when the 2-bit reserved field is set to 11, it indicates that the terminal mode of the terminal device is the mode 4.

When the control information includes a terminal type, a 1-bit reserved field may be used, and a value in the 1-bit reserved field is set to 1. When it is determined that the value in the 1-bit reserved field is not 0, it may be determined that the terminal mode of the terminal device is the second terminal type.

S303. The first terminal device determines, based on the control information and the terminal information, a terminal mode that is of the second terminal device and that exists when the second terminal device sends data on the first time-frequency resource.

Optionally, the terminal mode of the second terminal device may be determined in at least the following two feasible implementations:

First feasible implementation:

This feasible implementation is applicable to all application scenarios, that is, the at least two types of terminal information may be any one of the four cases shown in S301. A specific implementation may be as follows:

The first terminal device determines whether the control information includes a terminal mode. When the terminal type of the second terminal device is the first terminal type (R.14), the control information does not include a terminal mode. When the terminal type of the second terminal device is the second terminal type (R.15), the control information includes a terminal mode.

Optionally, the first terminal device may determine whether the control information includes the newly added flag field. If yes, the first terminal device determines that the control information includes a terminal mode; or otherwise, the first terminal device determines that the control information does not include a terminal mode. Optionally, the first terminal device may determine whether all values in the reserved field are 0. If yes, the first terminal device determines that the control information does not include a terminal mode; or otherwise, the first terminal device determines that the control information includes a terminal mode.

If yes, the first terminal device determines the terminal mode included in the control information as the terminal mode that is of the second terminal device and that exists when the second terminal device sends data on the first time-frequency resource. For example, when the terminal mode included in the control information is the mode 3, the first terminal device determines that the terminal mode of the second terminal device is the mode 3. When the terminal mode included in the control information is the mode 4, the first terminal device determines that the terminal mode that is of the second terminal device and that exists when the second terminal device sends data on the first time-frequency resource is the mode 4.

If no, the first terminal device determines first terminal information from the at least two types of terminal information, and determines a terminal mode included in the first terminal information as the terminal mode that is of the second terminal device and that exists when the second terminal device sends data on the first time-frequency resource. A terminal type in the first terminal information is the first terminal type.

Optionally, if the control information does not include a terminal mode, the first terminal device may determine that the terminal type of the second terminal device is the first terminal type (R.14). Because the at least two types of terminal information cannot include both R.14mode3 and R.14mode4, the first terminal information is R.14mode3 or R.14mode4. Therefore, the first terminal device can uniquely determine, based on the first terminal information, the terminal mode that is of the second terminal device and that exists when the second terminal device sends data on the first time-frequency resource. For example, it is assumed that the first terminal information determined from the at least two types of terminal information is R.14mode3. In this case, the first terminal device may determine that the terminal mode that is of the second terminal device and that exists when the second terminal device sends data on the first time-frequency resource is the mode 3 (mode 3).

Second feasible implementation:

This feasible implementation is applicable to some application scenarios, that is, in the at least two types of terminal information, terminal modes in every two types of terminal information are different, and terminal types in every two types of terminal information are different. Correspondingly, there are two types of terminal information. The two types of terminal information include R.14mode3 and R.15mode4, or the at least two types of terminal information include R.14mode4 and R.15mode3. A specific implementation may be as follows:

The first terminal device determines whether the control information includes a terminal type. When the terminal type of the second terminal device is the first terminal type (R.14), the control information does not include a terminal type. When the terminal type of the second terminal device is the second terminal type (R.15), the control information includes a terminal type (the terminal type included in the control information is R.15).

If yes, the first terminal device determines second terminal information from the at least two types of terminal information, and determines a terminal mode included in the second terminal information as the terminal mode that is of the second terminal device and that exists when the second terminal device sends data on the first time-frequency resource. A terminal type in the second terminal information is the second terminal type.

If the control information includes a terminal type, the first terminal device may determine that the terminal type of the second terminal device is the second terminal type (R.15). Because the at least two pieces of terminal information may include only one of R.15mode3 and R.15mode4, the second terminal information is R.15mode3 or R.15mode4. Therefore, the first terminal device can uniquely determine the terminal mode of the second terminal device based on the terminal mode included in the second terminal information. For example, it is assumed that the second terminal information determined from the at least two types of terminal information is R.15mode3. In this case, the first terminal device may determine that the terminal mode that is of the second terminal device and that exists when the second terminal device sends data on the first time-frequency resource is the mode 3 (mode 3).

If no, the first terminal device determines a terminal mode included in first terminal information as the terminal mode that is of the second terminal device and that exists when the second terminal device sends data on the first time-frequency resource. A terminal type in the first terminal information is the first terminal type.

If the control information does not include a terminal type, the first terminal device may determine that the terminal type of the second terminal device is the first terminal type (R.14). Because the at least two pieces of terminal information may include only one of R.14mode3 and R.14mode4, the first terminal information is R.14mode3 or R.14mode4. Therefore, the first terminal device can uniquely determine the terminal mode of the second terminal device based on the terminal mode included in the first terminal information. For example, it is assumed that the first terminal information determined from the at least two types of terminal information is R.14mode3. In this case, the first terminal device may determine that the terminal mode that is of the second terminal device and that exists when the second terminal device sends data on the first time-frequency resource is the mode 3 (mode 3).

It should be noted that, the terminal mode of the second terminal device may be further determined based on another feasible implementation manner.

For example, it is assumed that the at least two types of terminal information include R.14mode3 and R.15mode4. In this case, it is specified that a terminal device of the R.15 type adds indication information into control information when sending the control information. Correspondingly, after receiving the control information, the first terminal device determines whether the control information includes the indication information. If yes, the first terminal device may determine that the terminal mode of the second terminal device is the mode 4; or otherwise, the first terminal device may determine that the terminal mode of the second terminal device is the mode 3.

For example, it is assumed that the at least two types of terminal information include R.14mode4 and R.15mode3. In this case, it is specified that a terminal device of the R.15 type adds indication information into control information when sending the control information. Correspondingly, after receiving the control information, the first terminal device determines whether the control information includes the indication information. If yes, the first terminal device may determine that the terminal mode of the second terminal device is the mode 3; or otherwise, the first terminal device may determine that the terminal mode of the second terminal device is the mode 4.

For example, it is assumed that the at least two types of terminal information include R.14mode3, R.15mode3, and R.15mode4. In this case, it is specified that a terminal device of the R.15mode4 type adds indication information into control information when sending the control information. Correspondingly, after receiving the control information, the first terminal device determines whether the control information includes the indication information. If yes, the first terminal device may determine that the terminal mode of the second terminal device is the mode 4; or otherwise, the first terminal device may determine that the terminal mode of the second terminal device is the mode 3.

For example, it is assumed that the at least two types of terminal information include R.14mode4, R.15mode3, and R.15mode4. In this case, it is specified that a terminal device of the R.15mode3 type adds indication information into control information when sending the control information. Correspondingly, after receiving the control information, the first terminal device determines whether the control information includes the indication information. If yes, the first terminal device may determine that the terminal mode of the second terminal device is the mode 3; or otherwise, the first terminal device may determine that the terminal mode of the second terminal device is the mode 4.

It should be noted that, in the first time period, the first terminal device may receive a plurality of pieces of control information sent by a plurality of second terminal devices, and each piece of control information may indicate one first time-frequency resource. Therefore, there is at least one first time-frequency resource. The following describes in detail the first time-frequency resource with reference to FIG. 4.

Figure 4:
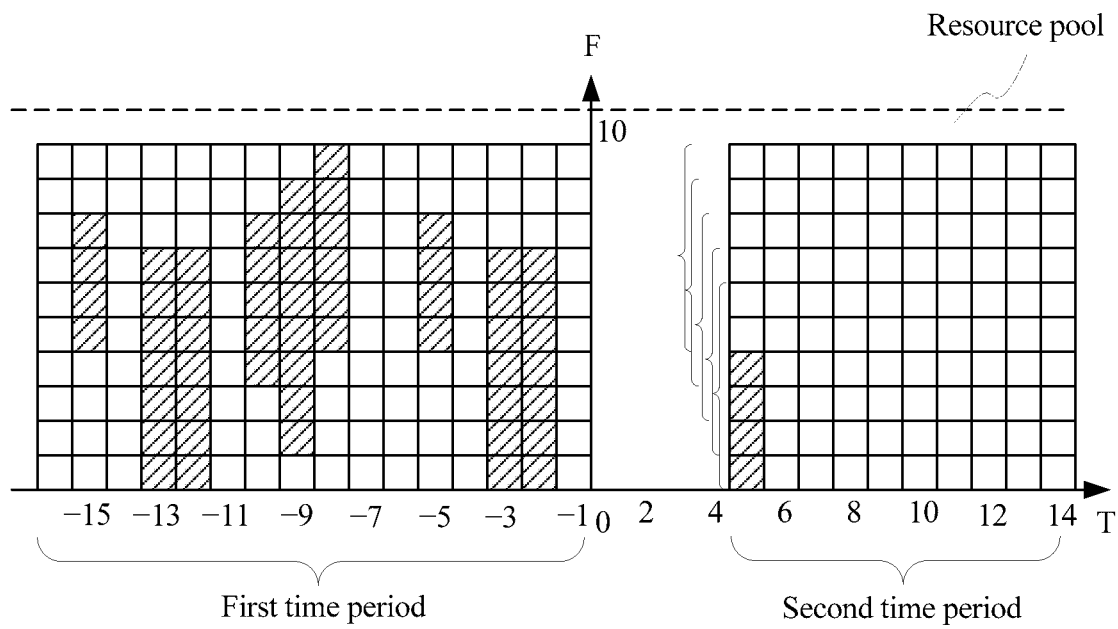
FIG. 4 is a schematic diagram of a first time-frequency resource according to this application.

FIG. 4 is a schematic diagram of a first time-frequency resource according to this application. Refer to FIG. 4, the horizontal axis represents a time domain, the vertical axis represents a frequency domain, and the coordinate origin represents a current moment. A time period before the current moment is the first time period, and the first time-frequency resource is some or all time-frequency resources in the first time period.

Refer to FIG. 4, the first time-frequency resource may be a time-frequency resource corresponding to a gray part in the first time period, and one first time-frequency resource may be a plurality of consecutive resource blocks in frequency domain in one subframe. For example, a time-frequency resource including a fifth resource block to an eighth resource block in frequency domain in a subframe −15 may be one first time-frequency resource, and a time-frequency resource including a first resource block to a seventh resource block in frequency domain in a subframe—13 may be one first time-frequency resource.

According to the terminal mode obtaining method provided in this application, when the shared resource pool is configured, the at least two types of terminal information of the terminal devices that can use the shared resource pool are configured. When the second terminal device needs to send data on the first time-frequency resource in the shared resource pool, the second terminal device sends the control information. Correspondingly, after receiving the control information sent by the second terminal device, the first terminal device may determine, based on the at least two types of terminal information and the control information, the terminal mode that is of the second terminal device and that exists when the second terminal device sends data on the first time-frequency resource.

On the basis of the embodiment shown in FIG. 2, optionally, after the first terminal device determines a terminal mode that is of each second terminal device and that exists when each second terminal device sends data on a corresponding first time-frequency resource, when a terminal mode of the first terminal device is R.15mode4, the first terminal device may select a candidate time-frequency resource from a time-frequency resource in a second time period (Refer to FIG. 4, the second time period is a time period after the current moment) in the shared resource pool based on the determined terminal mode. For a specific process, refer to the embodiments shown in FIG. 5 and FIG. 6. When a terminal mode of the first terminal device is R.15mode3, the first terminal device may assist the base station in allocating a time-frequency resource. For a specific process, refer to the embodiment shown in FIG. 7.

Figure 5:
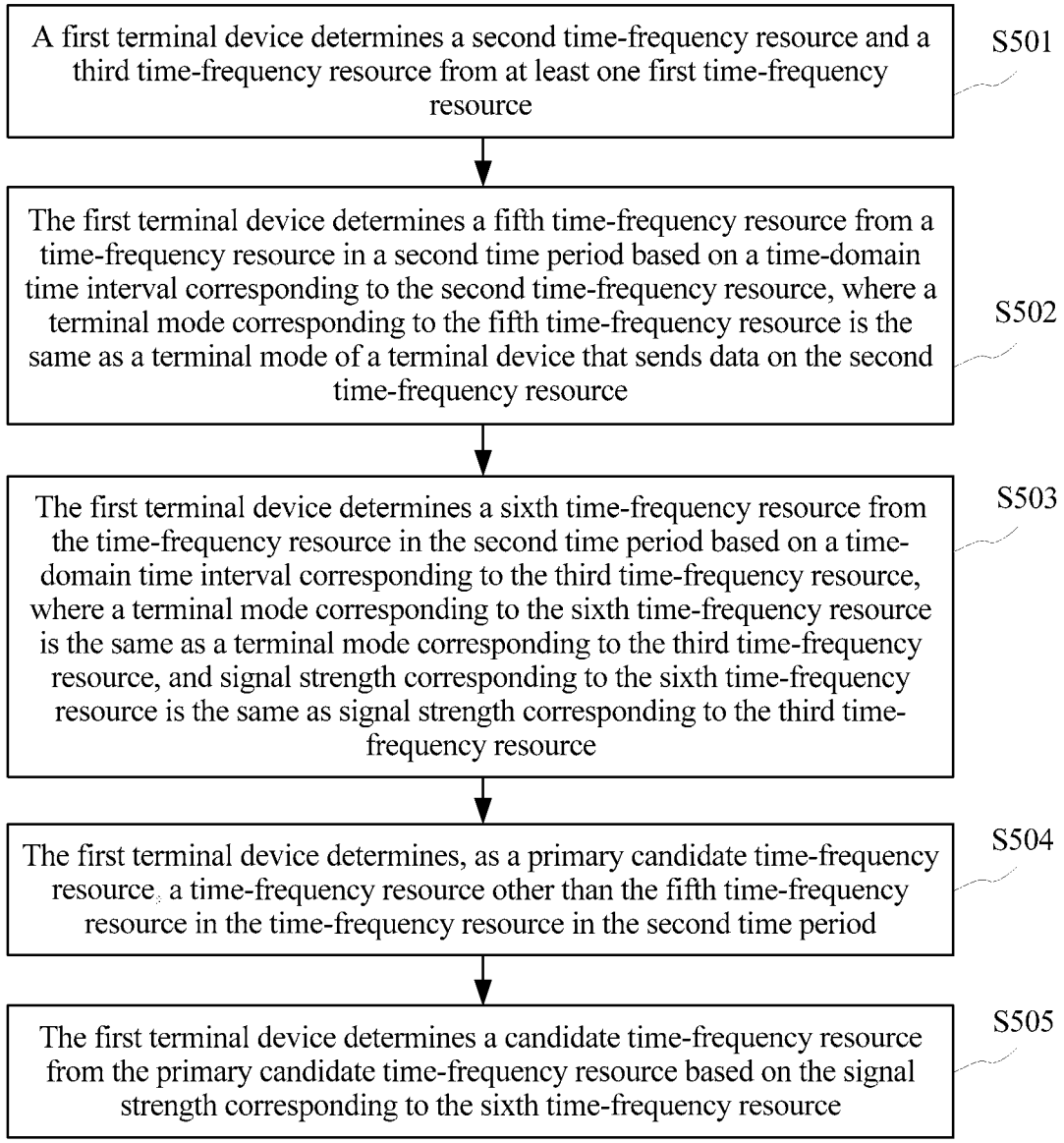
FIG. 5 is a schematic flowchart 1 of a method for selecting a candidate time-frequency resource by a first terminal device according to this application.
Figure 6:
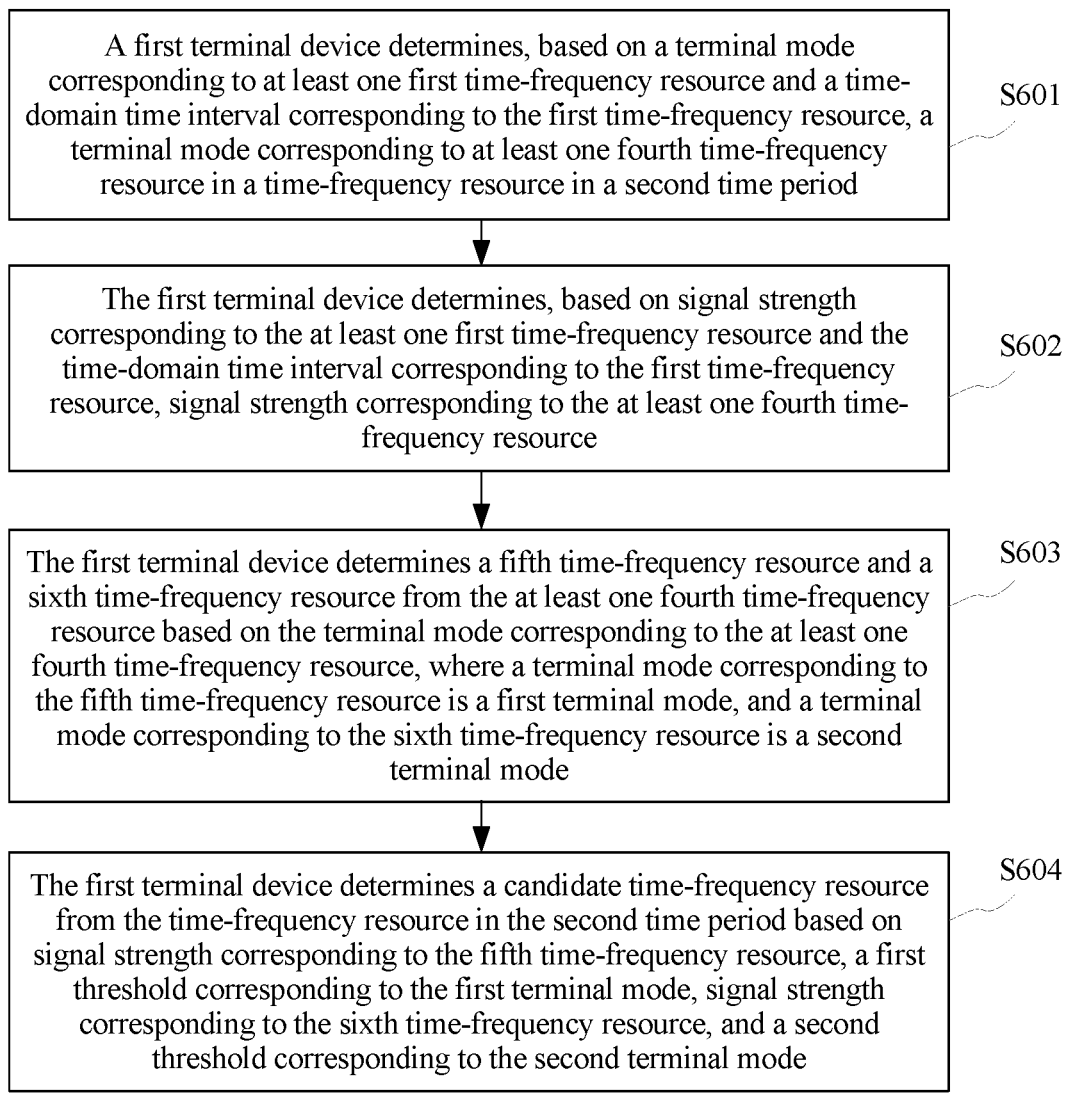
FIG. 6 is a schematic flowchart 2 of a method for selecting a candidate time-frequency resource by a first terminal device according to this application.

The following describes, by using the embodiments shown in FIG. 5 and FIG. 6, two manners in which the first terminal device (R.15mode4) selects the candidate time-frequency resource from the time-frequency resource in the second time period.

FIG. 5 is a schematic flowchart 1 of a method for selecting a candidate time-frequency resource by a first terminal device according to this application. Refer to FIG. 5, the method may include the following steps.

S501. The first terminal device determines a second time-frequency resource and a third time-frequency resource from at least one first time-frequency resource.

A terminal mode of a terminal device that sends data on the second time-frequency resource is the first terminal mode, and a terminal mode of a terminal device that sends data on the third time-frequency resource is the second terminal mode.

In this embodiment of the present invention, the first terminal device may receive at least one piece of control information in the first time period, and each piece of control information indicates one first time-frequency resource. Correspondingly, there is also at least one first time-frequency resource.

Optionally, the first terminal device may determine a terminal mode of a terminal device that sends data on each first time-frequency resource. When a terminal mode of a terminal device that sends data on a first time-frequency resource is the first terminal mode, the first terminal device may determine the first time-frequency resource as the second time-frequency resource. When a terminal mode of a terminal device that sends data on a first time-frequency resource is the second terminal mode, the first terminal device may determine the first time-frequency resource as the third time-frequency resource.

After S501, the first terminal device determines the candidate time-frequency resource from the time-frequency resource in the second time period based on a time-domain time interval corresponding to the second time-frequency resource, a time-domain time interval corresponding to the third time-frequency resource, and signal strength corresponding to the third time-frequency resource. Optionally, the first terminal device may determine the candidate time-frequency resource by using S502 to S505. Certainly, the first terminal device may alternatively determine the candidate time-frequency resource based on another feasible implementation manner. No limitation is specifically imposed in this application.

S502. The first terminal device determines a fifth time-frequency resource from a time-frequency resource in a second time period based on a time-domain time interval corresponding to the second time-frequency resource, where a terminal mode corresponding to the fifth time-frequency resource is the same as a terminal mode of a terminal device that sends data on the second time-frequency resource.

Optionally, the time-domain time interval corresponding to the second time-frequency resource is a time-domain time interval of the terminal device that sends data on the second time-frequency resource. For different services, the terminal device may have a same time-domain time interval or different time-domain time intervals.

Optionally, when sending data in one service on the second time-frequency resource, the terminal device may add, into corresponding control information, a time-domain time interval that is of the terminal device in terms of the service and is corresponding to the second time-frequency resource. Correspondingly, the first terminal device may obtain, from the control information, the time-domain time interval corresponding to the second time-frequency resource. When the control information carries no time-domain time interval, the first terminal device may determine all available time-domain time intervals of the terminal device that sends data on the second time-frequency resource as the time-domain time interval corresponding to the second time-frequency resource.

Optionally, a time-domain number of the second time-frequency resource and the time-domain time interval corresponding to the second time-frequency resource may be added, until an obtained time domain resource is in the second time period.

For example, Refer to FIG. 4, it is assumed that the second time-frequency resource is a second resource block to an eighth resource block in frequency domain in a subframe −9, and it is assumed that the time-domain time interval corresponding to the second time-frequency resource is 10. In this case, the fifth time-frequency resource is a second resource block to an eighth resource block in frequency domain in a subframe 1 (−9+10).

S503. The first terminal device determines a sixth time-frequency resource from the time-frequency resource in the second time period based on a time-domain time interval corresponding to the third time-frequency resource, where a terminal mode corresponding to the sixth time-frequency resource is the same as a terminal mode corresponding to the third time-frequency resource, and signal strength corresponding to the sixth time-frequency resource is the same as signal strength corresponding to the third time-frequency resource.

Optionally, the time-domain time interval corresponding to the third time-frequency resource may be obtained from corresponding control information. When the time-domain time interval corresponding to the third time-frequency resource cannot be obtained from the control information, the first terminal device no longer continues to determine the sixth time-frequency resource from the time-frequency resource in the second time period based on the time-domain time interval corresponding to the third time-frequency resource.

The signal strength corresponding to the third time-frequency resource is signal strength that can be detected by the first terminal device on the third time-frequency resource. For example, the signal strength may be reference signal received power (Reference Signal Received Power, RSRP for short). Larger transmit power of the terminal device that sends data on the third time-frequency resource indicates higher signal strength detected by the first terminal device on the third time-frequency resource, and a shorter distance between the first terminal device and the terminal device that sends data on the third time-frequency resource indicates higher signal strength detected by the first terminal device on the third time-frequency resource.

It should be noted that, the first terminal device may obtain, by using a prior-art method, the signal strength corresponding to the third time-frequency resource. Details are not described again in this application.

It should be further noted that, a method for determining the sixth time-frequency resource by the first terminal device is similar to the method for determining the fifth time-frequency resource in S502. Details are not described herein again.

It should be further noted that, there is no execution sequence between S502 and S503. S502 and S503 may be performed simultaneously, or S502 and S503 may be performed sequentially. When S502 and S503 are performed sequentially, S502 may be performed first, or S503 may be performed first.

After S502 and S503, the first terminal device may determine the candidate time-frequency resource from the time-frequency resource in the second time period based on the fifth time-frequency resource and the signal strength corresponding to the sixth time-frequency resource. Optionally, the candidate time-frequency resource may be determined by using S504 and S505. Certainly, the first terminal device may alternatively determine the candidate time-frequency resource based on another feasible implementation manner. No limitation is specifically imposed in this application.

S504. The first terminal device determines, as a primary candidate time-frequency resource, a time-frequency resource other than the fifth time-frequency resource in the time-frequency resource in the second time period.

Optionally, the first terminal device removes the fifth time-frequency resource from the time-frequency resource in the second time period, to obtain an initial candidate time-frequency resource.

S505. The first terminal device determines a candidate time-frequency resource from the primary candidate time-frequency resource based on the signal strength corresponding to the sixth time-frequency resource.

Optionally, the first terminal device removes, from the primary candidate time-frequency resource, a sixth time-frequency resource corresponding to signal strength greater than a preset threshold, to obtain the candidate time-frequency resource.

It should be noted that, in an actual application process, the first terminal device may alternatively first obtain the primary candidate resource based on the signal strength corresponding to the sixth time-frequency resource, and then remove the fifth time-frequency resource from the primary candidate resource to obtain the candidate time-frequency resource. Certainly, the first terminal device may simultaneously remove, from the time-frequency resource in the second time period, the fifth time-frequency resource and the sixth time-frequency resource corresponding to the signal strength greater than the preset threshold, to obtain the candidate time-frequency resource. No limitation is specifically imposed in this application.

It should be further noted that, the fifth time-frequency resource and the sixth time-frequency resource are usually only a part of the time-frequency resource in the second time period. Therefore, after the candidate time-frequency resource is determined based on the fifth time-frequency resource and the sixth time-frequency resource, a finally to-be-used time-frequency resource further needs to be selected from the candidate time-frequency resource based on a time-frequency resource other than the fifth time-frequency resource and the sixth time-frequency resource in the time-frequency resource in the second time period. Optionally, the finally to-be-used time-frequency resource may be selected from the candidate time-frequency resource by using a prior-art method. Details are not described again in this application.

It should be further noted that, the candidate time-frequency resource may be alternatively selected in the following feasible implementation:

Before S504, the first terminal device may determine, based on a size of data that needs to be sent, a quantity of resource blocks that need to be used, and determine an available time-frequency resource from the time-frequency resource in the second time period based on the quantity of resource blocks that need to be used. For example, Refer to FIG. 4, it is assumed that the quantity of resources that need to be used is 6. The first terminal device may determine, in a subframe 5, that available time-frequency resources are a first resource block to a sixth resource block, a second resource block to a seventh resource block, a third resource block to an eighth resource block, a fourth resource block to a ninth resource block, and a fifth resource block to a tenth resource block. Similarly, five available time-frequency resources may also be determined in a subframe 6. Refer to FIG. 4, because the second time period includes 10 subframes, the first terminal device may determine 5*10=50 available time-frequency resources in the second time period.

After the first terminal device determines all available time-frequency resources in the second time period, the first terminal device removes, from all the available time-frequency resources, an available time-frequency resource whose resource block overlaps that in the fifth time-frequency resource, and removes an available time-frequency resource whose resource block overlaps that in the sixth time-frequency resource corresponding to the signal strength greater than the preset threshold, to obtain a candidate available time-frequency resource.

For example, Refer to FIG. 4, it is assumed that a fifth time-frequency resource is a second resource block to a fourth resource block in the subframe 5. Because available time-frequency resources corresponding to the first resource block to the sixth resource block, the second resource block to the seventh resource block, the third resource block to the eighth resource block, and the fourth resource block to the ninth resource block all overlap the second resource block to the fourth resource block, the available time-frequency resources corresponding to the first resource block to the sixth resource block, the second resource block to the seventh resource block, the third resource block to the eighth resource block, and the fourth resource block to the ninth resource block are removed from all the available time-frequency resources. Correspondingly, a remaining available time-frequency resource in the subframe 5 is a time-frequency resource corresponding to the fifth resource block to the tenth resource block.

After the first terminal device determines the candidate available time-frequency resource, the first terminal device may select a finally to-be-used time-frequency resource from the candidate available time-frequency resource in a prior-art manner. Details are not described again in this application.

In the embodiment shown in FIG. 5, the determined fifth time-frequency resource may be used by a terminal device in the mode 3 in future. Because the terminal device in the mode 3 has a relatively strict interference requirement on another terminal device during data receiving/sending, the first terminal device excludes the fifth time-frequency resource from the candidate time-frequency resource, to ensure that the first terminal device definitely does not send data on the fifth time-frequency resource, thereby preventing the first terminal device from interfering with the terminal device that is in the mode 3 and that may send data on the fifth time-frequency resource. Further, the determined sixth time-frequency resource may be used by a terminal device in the mode 4 in future. When the signal strength that is corresponding to the sixth time-frequency resource and is estimated by the first terminal device is greater than the preset threshold, it indicates that power of the terminal device that sends data on the sixth time-frequency resource in future is excessively large, or a distance between the first terminal device and the terminal device that sends data on the sixth time-frequency resource in future is excessively short. Therefore, the first terminal device excludes, from the candidate time-frequency resource, a time-frequency resource that is corresponding to signal strength greater than the preset threshold and that is in the sixth time-frequency resource, to avoid mutual interference between the first terminal device and the terminal device that sends data on the sixth time-frequency resource corresponding to the signal strength greater than the preset threshold. It can be learned from the foregoing description that, the first terminal device may accurately select the candidate time-frequency resource from the time-frequency resource in the second time period by estimating a terminal mode corresponding to the time-frequency resource in the second time period.

FIG. 6 is a schematic flowchart 2 of a method for selecting a candidate time-frequency resource by a first terminal device according to this application. Refer to FIG. 6, the method may include the following steps.

S601. The first terminal device determines, based on a terminal mode corresponding to at least one first time-frequency resource and a time-domain time interval corresponding to the first time-frequency resource, a terminal mode corresponding to at least one fourth time-frequency resource in a time-frequency resource in a second time period.

Optionally, the at least one fourth time-frequency resource includes the fifth time-frequency resource and the sixth time-frequency resource in the embodiment shown in FIG. 5.

Optionally, the first terminal device may determine the at least one fourth time-frequency resource from the time-frequency resource in the second time period based on the time-frequency time interval corresponding to the at least one first time-frequency resource. A terminal mode corresponding to each fourth time-frequency resource is the same as a terminal mode corresponding to a first time-frequency resource corresponding to the fourth time-frequency resource.

It should be noted that, a process of determining the fourth time-frequency resource by the first terminal device is similar to the process of determining the fifth time-frequency resource in S502. Details are not described herein again.

S602. The first terminal device determines, based on signal strength corresponding to the at least one first time-frequency resource and the time-domain time interval corresponding to the first time-frequency resource, signal strength corresponding to the at least one fourth time-frequency resource.

Optionally, the signal strength corresponding to the fourth time-frequency resource is the same as signal strength corresponding to a first time-frequency resource corresponding to the fourth time-frequency resource.

After S601 and S602, the first terminal device determines the candidate time-frequency resource from the time-frequency resource in the second time period based on the terminal mode corresponding to the fourth time-frequency resource and the signal strength corresponding to the fourth time-frequency resource. Optionally, the first terminal device may determine the candidate time-frequency resource from the time-frequency resource in the second time period based on S603 and S604. Certainly, the first terminal device may alternatively determine the candidate time-frequency resource based on another feasible implementation manner. No limitation is specifically imposed in this application.

S603. The first terminal device determines a fifth time-frequency resource and a sixth time-frequency resource from the at least one fourth time-frequency resource based on the terminal mode corresponding to the at least one fourth time-frequency resource, where a terminal mode corresponding to the fifth time-frequency resource is a first terminal mode, and a terminal mode corresponding to the sixth time-frequency resource is a second terminal mode.

Optionally, when the first terminal device determines that a terminal mode corresponding to a fourth time-frequency resource is the first terminal mode, the first terminal device determines the fourth time-frequency resource as the fifth time-frequency resource. When the first terminal device determines that a terminal mode corresponding to a fourth time-frequency resource is the second terminal mode, the first terminal device determines the fourth time-frequency resource as the sixth time-frequency resource.

S604. The first terminal device determines the candidate time-frequency resource from the time-frequency resource in the second time period based on signal strength corresponding to the fifth time-frequency resource, a first threshold corresponding to the first terminal mode, signal strength corresponding to the sixth time-frequency resource, and a second threshold corresponding to the second terminal mode.

The first terminal mode is corresponding to the first threshold, and the second terminal mode is corresponding to the second threshold. Because an interference requirement of a terminal device in the mode 3 on another terminal device is stricter than an interference requirement of a terminal device in the mode 4 on another terminal device, the first threshold is less than the second threshold.

Optionally, a fifth time-frequency resource corresponding to signal strength greater than the first threshold and a sixth time-frequency resource corresponding to signal strength greater than the second threshold may be excluded from the candidate time-frequency resource.

It should be noted that, the fourth time-frequency resource is usually only a part of the time-frequency resource in the second time period. Therefore, after the candidate time-frequency resource is determined based on the fourth time-frequency resource, a finally to-be-used time-frequency resource further needs to be selected from the candidate time-frequency resource based on a time-frequency resource other than the fourth time-frequency resource in the time-frequency resource in the second time period. Optionally, the finally to-be-used time-frequency resource may be selected from the candidate time-frequency resource by using a prior-art method. Details are not described again in this application.

In the embodiment shown in FIG. 6, the first terminal device first determines the at least one fourth time-frequency resource from the time-frequency resource in the second time period, and obtains a terminal mode and signal strength that are corresponding to each fourth time-frequency resource. Different terminal modes are corresponding to different thresholds. The first terminal device determines the fifth time-frequency resource and the sixth time-frequency resource from the at least one fourth time-frequency resource based on the terminal mode corresponding to the fourth time-frequency resource, and determines the candidate time-frequency resource from the time-frequency resource in the second time period based on the signal strength corresponding to the fifth time-frequency resource, the first threshold corresponding to the first terminal mode, the signal strength corresponding to the sixth time-frequency resource, and the second threshold corresponding to the second terminal mode. Because the interference requirement of the terminal device in the mode 3 on another terminal device is different from the interference requirement of the terminal device in the mode 4 on another terminal device, the candidate time-frequency resource can be accurately selected from the time-frequency resource in the second time period by using the foregoing method.

Figure 7:
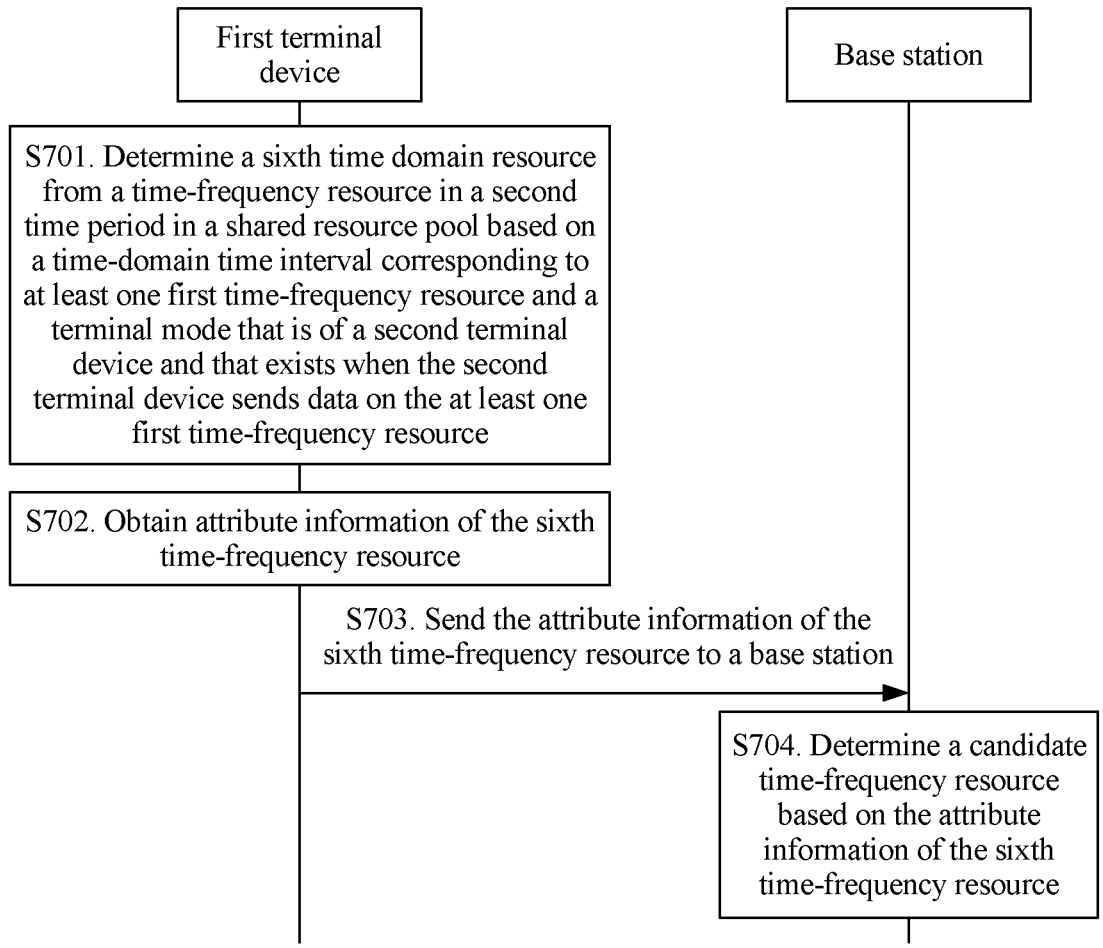
FIG. 7 is a schematic flowchart of a method for assisting, by a first terminal device, a base station in selecting a candidate time-frequency resource according to this application.

The following describes in detail, by using the embodiment shown in FIG. 7, a method for assisting, by the first terminal device (R.15mode3), the base station in selecting a time-frequency resource.

FIG. 7 is a schematic flowchart of a method for assisting, by a first terminal device, a base station in selecting a candidate time-frequency resource according to this application. Refer to FIG. 7, the method may include the following steps.

S701. The first terminal device determines a sixth time domain resource from a time-frequency resource in a second time period in the shared resource pool based on a time-domain time interval corresponding to at least one first time-frequency resource and a terminal mode that is of the second terminal device and that exists when the second terminal device sends data on the at least one first time-frequency resource.

A terminal mode corresponding to the sixth time domain resource is the second terminal mode.

Optionally, the first terminal device may first determine a third time-frequency resource from the at least one first time-frequency resource based on the terminal mode corresponding to the at least one first time-frequency resource. A terminal mode of a terminal device that sends data on the third time-frequency resource is the second terminal mode. Then, the first terminal device may determine the sixth time-frequency resource from the shared resource pool based on a time-domain time interval corresponding to the third time-frequency resource.

It should be noted that, for a process of determining the sixth time-frequency resource from the shared resource pool based on the time-domain time interval corresponding to the third time-frequency resource, refer to S502. Details are not described herein again.

S702. The first terminal device obtains attribute information of the sixth time-frequency resource.

Optionally, the attribute information includes at least a location of the sixth time-frequency resource in the shared resource pool, or the attribute information includes at least a location of the sixth time-frequency resource in the shared resource pool and signal strength corresponding to the sixth time-frequency resource.

S703. The first terminal device sends the attribute information of the sixth time-frequency resource to a base station.

S704. The base station determines a candidate time-frequency resource based on the attribute information of the sixth time-frequency resource.

Optionally, when the attribute information includes the location of the sixth time-frequency resource in the shared resource pool, the base station may determine, as the candidate time-frequency resource, a time-frequency resource other than the sixth time-frequency resource in the shared resource pool based on the location of the sixth time-frequency resource in the shared resource pool.

Optionally, when the attribute information includes the location of the sixth time-frequency resource in the shared resource pool and the signal strength corresponding to the sixth time-frequency resource, the base station may determine, as the candidate time-frequency resource based on the location of the sixth time-frequency resource in the shared resource pool and the signal strength corresponding to the sixth time-frequency resource, a time-frequency resource other than a sixth time-frequency resource that is corresponding to signal strength greater than a preset threshold and that is in the shared resource pool.

In the foregoing process, the base station allocates a time-frequency resource to a terminal device from the shared resource pool by using the attribute information that is of the sixth time-frequency resource and that is fed back by the first terminal device, to avoid allocating a time-frequency resource that may be used by a terminal device in the mode 4 in further to a terminal device in the mode 3, thereby preventing the terminal device in the mode 4 from interfering with the terminal device in the mode 3.

It should be noted that, the first terminal device may alternatively send attribute information of some sixth time-frequency resources to the base station. For example, the first terminal device may send, to the base station, attribute information of the sixth time-frequency resource corresponding to the signal strength greater than the preset threshold. Alternatively, the first terminal device may send, to the base station, attribute information of N sixth time-frequency resources corresponding to highest signal strength. N is a positive integer greater than or equal to 1, and a value of N may be set based on an actual requirement. Optionally, the first terminal device may further send the attribute information of some sixth time-frequency resources to the base station when the first terminal device determines that a quantity of sixth time-frequency resources is greater than a preset quantity.

Certainly, the first terminal device may alternatively send, to the base station, attribute information of a time-frequency resource other than the sixth time-frequency resource in the time-frequency resource in the second time period, so that the base station allocates a time-frequency resource to a terminal device from the time-frequency resource other than the sixth time-frequency resource in the time-frequency resource in the second time period. Optionally, the first terminal device may alternatively send, to the base station, attribute information of some time-frequency resources other than the sixth time-frequency resource in the time-frequency resource in the second time period.

Figure 8:
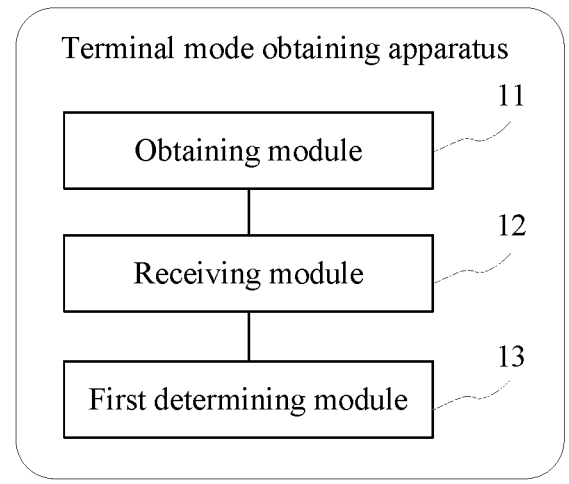
FIG. 8 is a schematic structural diagram 1 of a terminal mode obtaining apparatus according to this application.

FIG. 8 is a schematic structural diagram 1 of a terminal mode obtaining apparatus according to this application. The terminal mode obtaining apparatus may be disposed in a first terminal device. Refer to FIG. 8, the apparatus includes an obtaining module 11, a receiving module 12, and a first determining module 13.

The obtaining module 11 is configured to obtain at least two types of terminal information, where the at least two types of terminal information are terminal information of terminal devices that can use a shared resource pool, the shared resource pool is shared by terminal devices in at least two types of terminal modes, and the terminal information includes a terminal mode and a terminal type.

The receiving module 12 is configured to receive control information sent by a second terminal device, where the control information is used to indicate that the second terminal device sends data on a first time-frequency resource in a first time period in the shared resource pool.

The first determining module 13 is configured to determine, based on the control information and the terminal information, a terminal mode that is of the second terminal device and that exists when the second terminal device sends data on the first time-frequency resource.

It should be noted that, the terminal mode obtaining apparatus provided in this application may perform the technical solutions shown in the foregoing method embodiments. Implementation principles and beneficial effects of the apparatus are similar to those in the foregoing method embodiments, and details are not described herein again.

In a possible implementation, when a terminal type of the second terminal device is a second terminal type, the control information includes the terminal mode or the terminal type of the second terminal device.

In another possible implementation, the terminal information is broadcast by a base station, or is sent by a base station by using radio resource control RRC dedicated signaling; or the terminal information is preconfigured in the first terminal device.

In another possible implementation, the first determining module 13 is specifically configured to:

if the control information includes a terminal mode, determine the terminal mode included in the control information as the terminal mode of the second terminal device; or if the control information does not include the terminal mode, determine first terminal information from the at least two types of terminal information, and determine a terminal mode included in the first terminal information as the terminal mode of the second terminal device, where a terminal type in the first terminal information is a first terminal type.

In another possible implementation, in the at least two types of terminal information, terminal modes in every two types of terminal information are different, and terminal types in every two types of terminal information are different, and the first determining module 13 is specifically configured to:

if the control information includes a terminal type, determine second terminal information from the at least two types of terminal information based on the fact that the control information includes a terminal type, and determine a terminal mode included in the second terminal information as the terminal mode of the second terminal device, where a terminal type in the second terminal information is the second terminal type; or if the control information does not include the terminal type, determine first terminal information from the at least two types of terminal information, and determine a terminal type included in the first terminal information as the terminal type of the second terminal device, where the terminal type in the first terminal information is a first terminal type.

Figure 9:
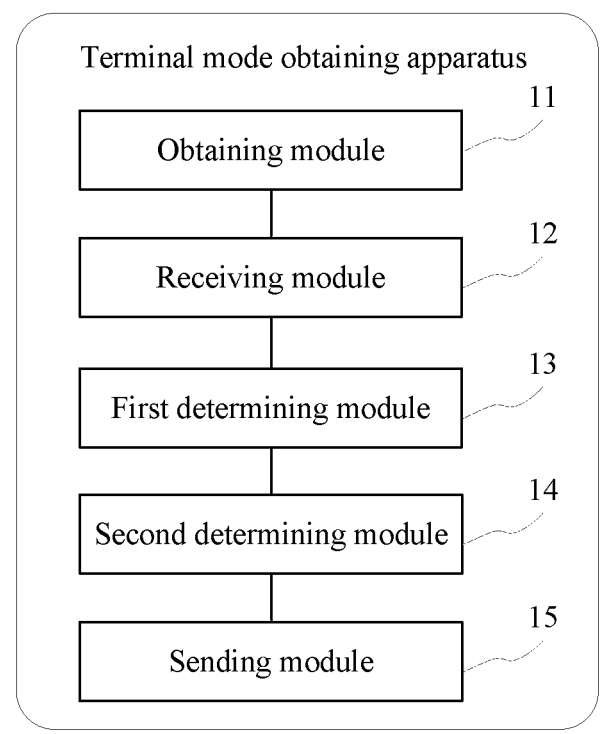
FIG. 9 is a schematic structural diagram 2 of a terminal mode obtaining apparatus according to this application.

FIG. 9 is a schematic structural diagram 2 of a terminal mode obtaining apparatus according to this application. On the basis of the embodiment shown in FIG. 8, Refer to FIG. 9, the apparatus further includes a second determining module 14. When a terminal type of the first terminal device is the second terminal type, a terminal mode of the first terminal device is a second terminal mode, and there is at least one first time-frequency resource, the second determining module 14 is specifically configured to:

determine a candidate time-frequency resource from a time-frequency resource in a second time period in the shared resource pool based on signal strength corresponding to the at least one first time-frequency resource and a terminal mode that is of the second terminal device and that exists when the second terminal device sends data on the at least one first time-frequency resource.

In another possible implementation, the second determining module 14 is specifically configured to:

determine a second time-frequency resource and a third time-frequency resource from the at least one first time-frequency resource based on the terminal mode that is of the second terminal device and that exists when the second terminal device sends data on the at least one first time-frequency resource, where a terminal mode of a terminal device that sends data on the second time-frequency resource is a first terminal mode, and a terminal mode of a terminal device that sends data on the third time-frequency resource is the second terminal mode; and determine the candidate time-frequency resource from the time-frequency resource in the second time period based on a time-domain time interval corresponding to the second time-frequency resource, a time-domain time interval corresponding to the third time-frequency resource, and signal strength corresponding to the third time-frequency resource.

In another possible implementation, the second determining module 14 is specifically configured to:

determine a fifth time-frequency resource from the time-frequency resource in the second time period based on the time-domain time interval corresponding to the second time-frequency resource, where a terminal mode corresponding to the fifth time-frequency resource is the same as the terminal mode of the terminal device that sends data on the second time-frequency resource;

determine a sixth time-frequency resource from the time-frequency resource in the second time period based on the time-domain time interval corresponding to the third time-frequency resource, where a terminal mode corresponding to the sixth time-frequency resource is the same as the terminal mode of the terminal device that sends data on the third time-frequency resource, and signal strength corresponding to the sixth time-frequency resource is the same as the signal strength corresponding to the third time-frequency resource; and determine the candidate time-frequency resource from the time-frequency resource in the second time period based on the fifth time-frequency resource and the signal strength corresponding to the sixth time-frequency resource.

In another possible implementation, the second determining module 14 is specifically configured to:

determine, as a primary candidate time-frequency resource, a time-frequency resource other than the fifth time-frequency resource in the time-frequency resource in the second time period; and determine the candidate time-frequency resource from the primary candidate time-frequency resource based on the signal strength corresponding to the sixth time-frequency resource.

In another possible implementation, the second determining module 14 is specifically configured to:

determine, based on a time-domain time interval corresponding to the at least one first time-frequency resource and the terminal mode that is of the second terminal device and that exists when the second terminal device sends data on the at least one first time-frequency resource, a terminal mode corresponding to at least one fourth time-frequency resource in the time-frequency resource in the second time period;

determine, based on the signal strength corresponding to the at least one first time-frequency resource and the time-domain time interval corresponding to the at least one first time-frequency resource, signal strength corresponding to the at least one fourth time-frequency resource; and determine the candidate time-frequency resource from the time-frequency resource in the second time period based on the terminal mode corresponding to the at least one fourth time-frequency resource and the signal strength corresponding to the at least one fourth time-frequency resource.

In another possible implementation, the second determining module 14 is specifically configured to:

determine a fifth time-frequency resource and a sixth time-frequency resource from the at least one fourth time-frequency resource based on the terminal mode corresponding to the at least one fourth time-frequency resource, where a terminal mode corresponding to the fifth time-frequency resource is a first terminal mode, and a terminal mode corresponding to the sixth time-frequency resource is the second terminal mode; and determine the candidate time-frequency resource from the time-frequency resource in the second time period based on signal strength corresponding to the fifth time-frequency resource, a first threshold corresponding to the first terminal mode, signal strength corresponding to the sixth time-frequency resource, and a second threshold corresponding to the second terminal mode.

In another possible implementation, the apparatus further includes a sending module 15. When a terminal type of the first terminal device is the second terminal type, a terminal mode of the first terminal device is a first terminal mode, and there is at least one first time-frequency resource, the second determining module 14 is further configured to determine a sixth time domain resource from a time-frequency resource in a second time period in the shared resource pool based on a time-domain time interval corresponding to the at least one first time-frequency resource and a terminal mode that is of the second terminal device and that exists when the second terminal device sends data on the at least one first time-frequency resource, where a terminal mode corresponding to the sixth time domain resource is a second terminal mode.

The sending module 15 is configured to: obtain attribute information of the sixth time-frequency resource, and send the attribute information of the sixth time-frequency resource to the base station, where the attribute information includes at least a location of the sixth time-frequency resource in the shared resource pool, or the attribute information includes at least a location of the sixth time-frequency resource in the shared resource pool and signal strength corresponding to the sixth time-frequency resource.

In another possible implementation, the first terminal type is an R.14 terminal type, and the second terminal type is an R.15 terminal type.

The first terminal mode is a mode 3, and the second terminal mode is a mode 4.

It should be noted that, the terminal mode obtaining apparatus provided in this application may perform the technical solutions shown in the foregoing method embodiments. Implementation principles and beneficial effects of the apparatus are similar to those in the foregoing method embodiments, and details are not described herein again.

Figure 10:
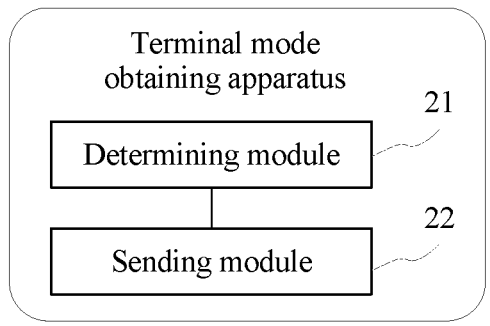
FIG. 10 is a schematic structural diagram of another terminal mode obtaining apparatus according to this application.

FIG. 10 is a schematic structural diagram of another terminal mode obtaining apparatus according to this application. The apparatus may be disposed in the second terminal device shown in the foregoing method embodiments. Refer to FIG. 10, the apparatus may include a determining module 21 and a sending module 22.

The determining module 21 is configured to determine control information, where the control information includes a terminal mode or a terminal type of the second terminal device, and the terminal type of the second terminal device is a second terminal type.

The sending module 22 is configured to send the control information to a first terminal device.

It should be noted that, the terminal mode obtaining apparatus provided in this application may perform the technical solutions shown in the foregoing method embodiments. Implementation principles and beneficial effects of the apparatus are similar to those in the foregoing method embodiments, and details are not described herein again.

Figure 11:
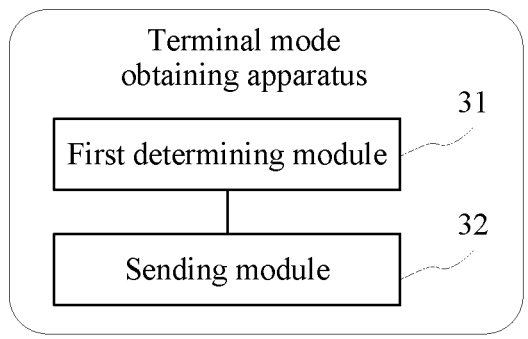
FIG. 11 is a schematic structural diagram 1 of still another terminal mode obtaining apparatus according to this application.

FIG. 11 is a schematic structural diagram 1 of still another terminal mode obtaining apparatus according to this application. The apparatus may be disposed in a base station. Refer to FIG. 11, the apparatus may include a first determining module 31 and a sending module 32.

The first determining module 31 is configured to determine at least two types of terminal information corresponding to a shared resource pool, where the shared resource pool is shared by terminal devices in at least two types of terminal modes, the at least two types of terminal information are terminal information of terminal devices that can use the shared resource pool, and the terminal information includes a terminal mode and a terminal type.

The sending module 32 is configured to send the at least two types of terminal information to a first terminal device.

It should be noted that, the terminal mode obtaining apparatus provided in this application may perform the technical solutions shown in the foregoing method embodiments. Implementation principles and beneficial effects of the apparatus are similar to those in the foregoing method embodiments, and details are not described herein again.

Figure 12:
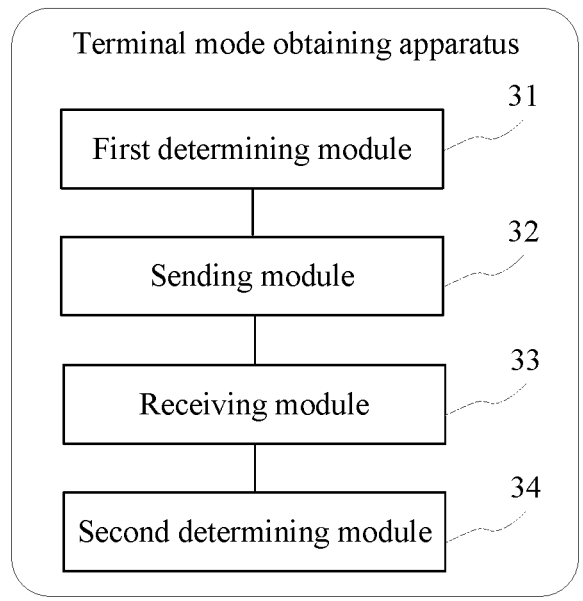
FIG. 12 is a schematic structural diagram 2 of still another terminal mode obtaining apparatus according to this application.

FIG. 12 is a schematic structural diagram 2 of still another terminal mode obtaining apparatus according to this application. On the basis of the embodiment in FIG. 11, Refer to FIG. 12, the apparatus further includes a receiving module 33 and a second determining module 34.

The receiving module 33 is configured to receive attribute information that is of a sixth time-frequency resource and that is sent by the first terminal device, where the attribute information includes at least a location of the sixth time-frequency resource in the shared resource pool, or the attribute information includes at least a location of the sixth time-frequency resource in the shared resource pool and signal strength corresponding to the sixth time-frequency resource.

The second determining module 34 is configured to determine a candidate time-frequency resource based on the attribute information of the sixth time-frequency resource.

It should be noted that, the terminal mode obtaining apparatus provided in this application may perform the technical solutions shown in the foregoing method embodiments. Implementation principles and beneficial effects of the apparatus are similar to those in the foregoing method embodiments, and details are not described herein again.

Figure 13:
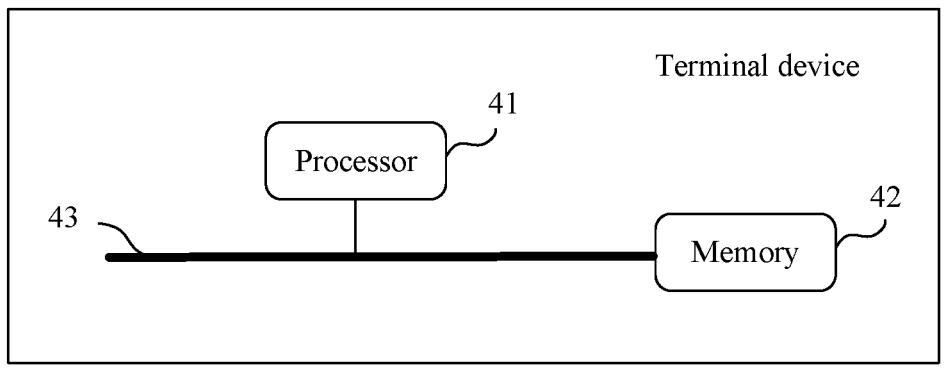
FIG. 13 is a schematic structural diagram of a terminal device according to this application.

FIG. 13 is a schematic structural diagram of a terminal device according to this application. Refer to FIG. 13, the terminal device may include a processor 41, a memory 42, and a communications bus 43. The communications bus 43 is configured to implement connections between components. The memory 42 is configured to store a program instruction. The processor 41 is configured to: read the program instruction in the memory 42, and perform, based on the program instruction in the memory 42, the method shown in the foregoing method embodiments.

It should be noted that, the terminal device provided in this application may perform the technical solutions shown in the foregoing method embodiments. Implementation principles and beneficial effects of the terminal device are similar to those in the foregoing method embodiments, and details are not described herein again.

Figure 14:
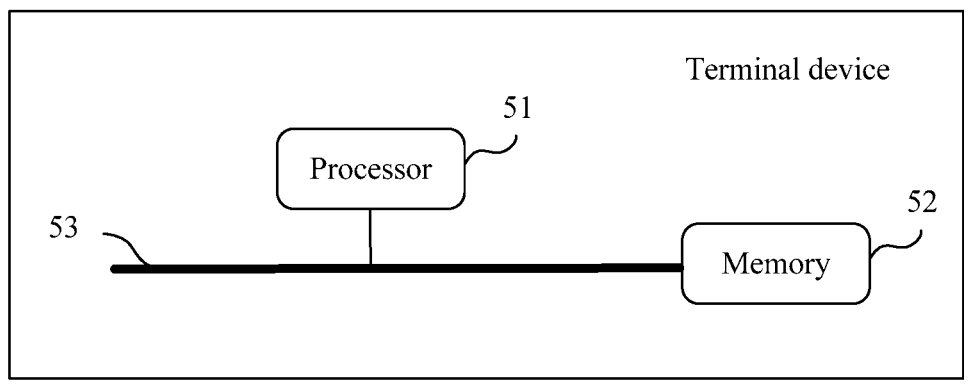
FIG. 14 is a schematic structural diagram of another terminal device according to this application.

FIG. 14 is a schematic structural diagram of another terminal device according to this application. Refer to FIG. 14, the terminal device may include a processor 51, a memory 52, and a communications bus 53. The communications bus 53 is configured to implement connections between components. The memory 52 is configured to store a program instruction. The processor 51 is configured to: read the program instruction in the memory 52, and perform, based on the program instruction in the memory 52, the method shown in the foregoing method embodiments.

Figure 15:
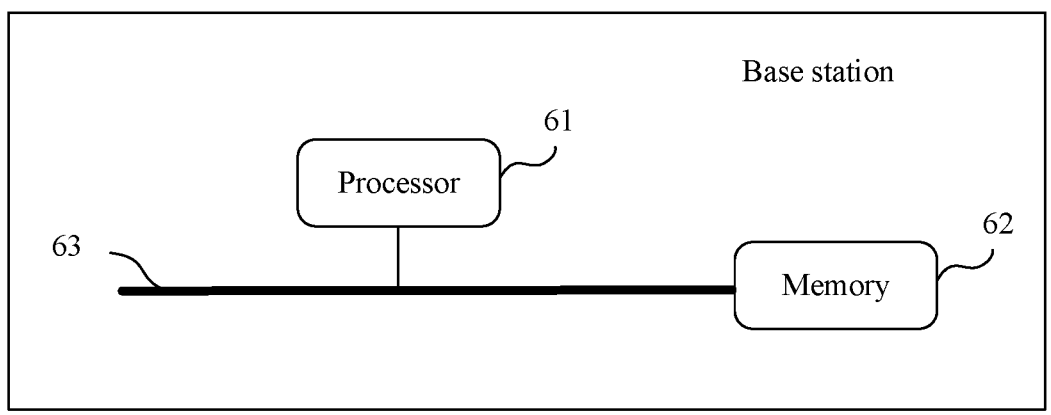
FIG. 15 is a schematic structural diagram of a base station according to this application.

FIG. 15 is a schematic structural diagram of a base station according to this application. Refer to FIG. 15, the base station may include a processor 61, a memory 62, and a communications bus 63. The communications bus 63 is configured to implement connections between components. The memory 62 is configured to store a program instruction. The processor 61 is configured to: read the program instruction in the memory 62, and perform, based on the program instruction in the memory 62, the method shown in the foregoing method embodiments.

This application further provides a computer readable storage medium. The computer readable storage medium stores a computer executable instruction. When at least one processor of a storage device executes the computer executable instruction, the storage device performs the data read method provided in the foregoing possible designs.

This application further provides a computer program product. The computer program product includes a computer executable instruction. The computer executable instruction is stored in a computer readable storage medium. At least one processor of a storage device may read the computer executable instruction from the computer readable storage medium. The at least one processor executes the computer executable instruction, so that the storage device performs the data read method provided in the possible designs in the foregoing method embodiments.

This application further provides a chip system. The chip system includes a processor, configured to support a terminal device in implementing a function in the foregoing aspects, for example, processing information in the foregoing method. In a possible design, the chip system further includes a memory, where the memory is configured to store a program instruction and data that are necessary for a data sending device. The chip system may include a chip, or may include a chip and another discrete device.

Persons of ordinary skill in the art may understand that all or some steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

What is claimed is:

1. A terminal mode obtaining method, comprising:
   obtaining, by a first terminal device and from at least one of a protocol, a base station, or a pre-configuration in the first terminal device, at least two types of terminal information corresponding to a shared resource pool, wherein the shared resource pool is shared by a plurality of terminal devices in at least two types of terminal modes, and wherein terminal information of each of the plurality of terminal devices comprises a respective terminal mode and a respective terminal type;
   receiving, by the first terminal device, control information sent by a second terminal device, wherein the control information indicates that the second terminal device sends data on a first time-frequency resource in a first time period in the shared resource pool;
   determining, by the first terminal device and based on the control information and the at least two types of terminal information, a terminal mode that is of the second terminal device and that exists when the second terminal device sends data on the first time-frequency resource; and wherein when a terminal type of the first terminal device is a second terminal type, and a terminal mode of the first terminal device is a second terminal mode, the method further comprises:

determining, by the first terminal device, a candidate time-frequency resource from a time-frequency resource in a second time period in the shared resource pool based on signal strength corresponding to the first time-frequency resource and the terminal mode that is of the second terminal device and that exists when the second terminal device sends data on the first time-frequency resource.

2. The method according to claim 1, wherein when a terminal type of the second terminal device is the second terminal type, the control information comprises the terminal mode or the terminal type of the second terminal device.

3. The method according to claim 1, wherein:

the at least two types of terminal information are broadcasted by the base station, or is sent by the base station by using radio resource control (RRC) dedicated signaling; or the at least two types of terminal information are preconfigured in the first terminal device.

4. The method according to claim 1, wherein the determining, by the first terminal device and based on the control information and the at least two types of terminal information, the terminal mode that is of the second terminal device and that exists when the second terminal device sends data on the first time-frequency resource comprises:

if the control information comprises a terminal mode, determining, by the first terminal device, the terminal mode comprised in the control information as the terminal mode that is of the second terminal device and that exists when the second terminal device sends data on the first time-frequency resource; or if the control information does not comprise the terminal mode, determining, by the first terminal device, first terminal information from the at least two types of terminal information, and determining a terminal mode comprised in the first terminal information as the terminal mode that is of the second terminal device and that exists when the second terminal device sends data on the first time-frequency resource, wherein a terminal type in the first terminal information is a first terminal type.

5. The method according to claim 1, wherein in the at least two types of terminal information, terminal modes in every two types of terminal information are different, and terminal types in every two types of terminal information are different, and wherein the determining, by the first terminal device and based on the control information and the at least two types of terminal information, the terminal mode that is of the second terminal device and that exists when the second terminal device sends data on the first time-frequency resource comprises:

if the control information comprises a terminal type, determining, by the first terminal device, second terminal information from the at least two types of terminal information based on the terminal type comprised in the control information, and determining a terminal mode comprised in the second terminal information as the terminal mode that is of the second terminal device and that exists when the second terminal device sends data on the first time-frequency resource, wherein a terminal type in the second terminal information is the second terminal type; or if the control information does not comprise the terminal type, determining first terminal information from the at least two types of terminal information, and determining a terminal type comprised in the first terminal information as the terminal type that is of the second terminal device and that exists when the second terminal device sends data on the first time-frequency resource, wherein the terminal type in the first terminal information is a first terminal type.

6. The method according to claim 1, wherein the determining, by the first terminal device, the candidate time-frequency resource from the time-frequency resource in the second time period in the shared resource pool based on the signal strength corresponding to the first time-frequency resource and the terminal mode that is of the second terminal device and that exists when the second terminal device sends data on the first time-frequency resource comprises:

determining, by the first terminal device, a second time-frequency resource and a third time-frequency resource from the first time-frequency resource based on the terminal mode that is of the second terminal device and that exists when the second terminal device sends data on the first time-frequency resource, wherein a terminal mode of a terminal device that sends data on the second time-frequency resource is a first terminal mode, and a terminal mode of a terminal device that sends data on the third time-frequency resource is the second terminal mode; and determining, by the first terminal device, the candidate time-frequency resource from the time-frequency resource in the second time period based on a time-domain time interval corresponding to the second time-frequency resource, a time-domain time interval corresponding to the third time-frequency resource, and signal strength corresponding to the third time-frequency resource.

7. The method according to claim 6, wherein the determining, by the first terminal device, the candidate time-frequency resource from the time-frequency resource in the second time period based on the time-domain time interval corresponding to the second time-frequency resource, the time-domain time interval corresponding to the third time-frequency resource, and the signal strength corresponding to the third time-frequency resource comprises:

determining, by the first terminal device, a fifth time-frequency resource from the time-frequency resource in the second time period based on the time-domain time interval corresponding to the second time-frequency resource, wherein a terminal mode corresponding to the fifth time-frequency resource is the same as the terminal mode of the terminal device that sends data on the second time-frequency resource;

determining, by the first terminal device, a sixth time-frequency resource from the time-frequency resource in the second time period based on the time-domain time interval corresponding to the third time-frequency resource, wherein a terminal mode corresponding to the sixth time-frequency resource is the same as the terminal mode of the terminal device that sends data on the third time-frequency resource, and signal strength corresponding to the sixth time-frequency resource is the same as the signal strength corresponding to the third time-frequency resource; and determining, by the first terminal device, the candidate time-frequency resource from the time-frequency resource in the second time period based on the fifth time-frequency resource and the signal strength corresponding to the sixth time-frequency resource.

8. The method according to claim 7, wherein the determining, by the first terminal device, the candidate time-frequency resource from the time-frequency resource in the second time period based on the fifth time-frequency resource and the signal strength corresponding to the sixth time-frequency resource comprises:
determining, by the first terminal device and as a primary candidate time-frequency resource, a time-frequency resource other than the fifth time-frequency resource in the time-frequency resource in the second time period; and
determining, by the first terminal device, the candidate time-frequency resource from the primary candidate time-frequency resource based on the signal strength corresponding to the sixth time-frequency resource.

9. The method according to claim 1, wherein the determining, by the first terminal device, the candidate time-frequency resource from the time-frequency resource in the second time period in the shared resource pool based on the signal strength corresponding to the first time-frequency resource and the terminal mode that is of the second terminal device and that exists when the second terminal device sends data on the first time-frequency resource comprises:
determining, by the first terminal device and based on a time-domain time interval corresponding to the first time-frequency resource and the terminal mode that is of the second terminal device and that exists when the second terminal device sends data on the first time-frequency resource, a terminal mode corresponding to at least one fourth time-frequency resource in the time-frequency resource in the second time period;
determining, by the first terminal device and based on the signal strength corresponding to the first time-frequency resource and the time-domain time interval corresponding to the first time-frequency resource, signal strength corresponding to the at least one fourth time-frequency resource; and
determining, by the first terminal device, the candidate time-frequency resource from the time-frequency resource in the second time period based on the terminal mode corresponding to the at least one fourth time-frequency resource and the signal strength corresponding to the at least one fourth time-frequency resource.

10. The method according to claim 9, wherein the determining, by the first terminal device, the candidate time-frequency resource from the time-frequency resource in the second time period based on the terminal mode corresponding to the at least one fourth time-frequency resource and the signal strength corresponding to the at least one fourth time-frequency resource comprises:
determining, by the first terminal device, a fifth time-frequency resource and a sixth time-frequency resource from the at least one fourth time-frequency resource based on the terminal mode corresponding to the at least one fourth time-frequency resource, wherein a terminal mode corresponding to the fifth time-frequency resource is a first terminal mode, and a terminal mode corresponding to the sixth time-frequency resource is the second terminal mode; and
determining, by the first terminal device, the candidate time-frequency resource from the time-frequency resource in the second time period based on signal strength corresponding to the fifth time-frequency resource, a first threshold corresponding to the first terminal mode, signal strength corresponding to the sixth time-frequency resource, and a second threshold corresponding to the second terminal mode.

11. The method according to claim 1, wherein when the terminal type of the first terminal device is the second terminal type, the terminal mode of the first terminal device is a first terminal mode, the method further comprises:
determining, by the first terminal device, a sixth time domain resource from the time-frequency resource in the second time period in the shared resource pool based on a time-domain time interval corresponding to the first time-frequency resource and the terminal mode that is of the second terminal device and that exists when the second terminal device sends data on the first time-frequency resource, wherein a terminal mode corresponding to the sixth time domain resource is the second terminal mode; and
obtaining, by the first terminal device, attribute information of a sixth time-frequency resource, and sending the attribute information of the sixth time-frequency resource to the base station, wherein the attribute information comprises at least a location of the sixth time-frequency resource in the shared resource pool, or the attribute information comprises at least the location of the sixth time-frequency resource in the shared resource pool and signal strength corresponding to the sixth time-frequency resource.

12. A terminal mode obtaining apparatus, applied to a first terminal device, wherein the apparatus comprises:
at least one processor; and
a non-transitory computer-readable storage medium coupled to the at least one processor and storing programming instructions for execution by the at least one processor, wherein the programming instructions instruct the at least one processor to perform operations comprising:
obtaining, from at least one of a protocol, a base station, or a pre-configuration in the first terminal device, at least two types of terminal information corresponding to a shared resource pool, wherein the shared resource pool is shared by a plurality of terminal devices in at least two types of terminal modes, and wherein terminal information of each of the plurality of terminal devices comprises a respective terminal mode and a respective terminal type;
receiving control information sent by a second terminal device, wherein the control information indicates that the second terminal device sends data on a first time-frequency resource in a first time period in the shared resource pool;
determining, based on the control information and the at least two types of terminal information, a terminal mode that is of the second terminal device and that exists when the second terminal device sends data on the first time-frequency resource; and
wherein when a terminal type of the first terminal device is a second terminal type, and a terminal mode of the first terminal device is a second terminal mode, the operations further comprises:
determining a candidate time-frequency resource from a time-frequency resource in a second time period in the shared resource pool based on signal strength corresponding to the first time-frequency resource and the terminal mode that is of the second terminal device and that exists when the second terminal device sends data on the first time-frequency resource.

13. The apparatus according to claim 12, wherein when a terminal type of the second terminal device is the second terminal type, the control information comprises the terminal mode or the terminal type of the second terminal device.

14. The apparatus according to claim 12, wherein
the at least two types of terminal information are broadcasted by the base station, or is sent by the base station by using radio resource control (RRC) dedicated signaling; or
the at least two types of terminal information are preconfigured in the first terminal device.

15. The apparatus according to claim 12, wherein the determining, based on the control information and the at least two types of terminal information, the terminal mode that is of the second terminal device and that exists when the second terminal device sends data on the first time-frequency resource comprises:
   if the control information comprises a terminal mode, determining the terminal mode comprised in the control information as the terminal mode of the second terminal device; or
   if the control information does not comprise the terminal mode, determining first terminal information from the at least two types of terminal information, and determine a terminal mode comprised in the first terminal information as the terminal mode of the second terminal device, wherein a terminal type in the first terminal information is a first terminal type.

16. The apparatus according to claim 12, wherein in the at least two types of terminal information, terminal modes in every two types of terminal information are different, and terminal types in every two types of terminal information are different, and wherein the determining, based on the control information and the at least two types of terminal information, the terminal mode that is of the second terminal device and that exists when the second terminal device sends data on the first time-frequency resource comprises:
   if the control information comprises a terminal type, determining second terminal information from the at least two types of terminal information based on the terminal type comprised in the control information, and determine a terminal mode comprised in the second terminal information as the terminal mode of the second terminal device, wherein a terminal type in the second terminal information is the second terminal type; or
   if the control information does not comprise the terminal type, determining first terminal information from the at least two types of terminal information, and determine a terminal type comprised in the first terminal information as the terminal type of the second terminal device, wherein the terminal type in the first terminal information is a first terminal type.

* * * * *